US011441418B2

(12) United States Patent
Kusuma et al.

(10) Patent No.: US 11,441,418 B2
(45) Date of Patent: Sep. 13, 2022

(54) DOWNHOLE ELECTROMAGNETIC NETWORK

(71) Applicant: SCHLUMBERGER TECHNOLOGY CORPORATION, Sugar Land, TX (US)

(72) Inventors: Julius Kusuma, Fremont, CA (US); Robert Tennent, Katy, TX (US); Arnaud Croux, Cambridge, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 2 days.

(21) Appl. No.: 16/314,165

(22) PCT Filed: Jun. 28, 2017

(86) PCT No.: PCT/US2017/039728
§ 371 (c)(1),
(2) Date: Dec. 28, 2018

(87) PCT Pub. No.: WO2018/005634
PCT Pub. Date: Jan. 4, 2018

(65) Prior Publication Data
US 2020/0291768 A1    Sep. 17, 2020

Related U.S. Application Data

(60) Provisional application No. 62/356,810, filed on Jun. 30, 2016.

(51) Int. Cl.
*E21B 47/13*       (2012.01)
*E21B 17/00*       (2006.01)
(Continued)

(52) U.S. Cl.
CPC ............ *E21B 47/13* (2020.05); *E21B 17/003* (2013.01); *G01V 3/12* (2013.01); *E21B 47/18* (2013.01)

(58) Field of Classification Search
CPC combination set(s) only.
See application file for complete search history.

(56) References Cited

U.S. PATENT DOCUMENTS 2,411,696  A     11/1946  Silverman
4,181,014  A  *   1/1980  Zuvela .................. E21B 47/001
                                            340/853.5
(Continued)

FOREIGN PATENT DOCUMENTS

WO     2011028625 A2    3/2011
WO     2016033178 A1    3/2016
(Continued)

*Primary Examiner* — Nabil H Syed
*Assistant Examiner* — Cal J Eustaquio
(74) *Attorney, Agent, or Firm* — Trevor G. Grove

(57) ABSTRACT

The present disclosure describes methods and systems that can be used for controlling and coordinating the transmission of electromagnetic telemetry signals from and/or to a plurality of downhole tools to minimize or reduce electromagnetic interference between the transmissions. Signal coordination control is also disclosed that allows for duplex bidirectional communication of transmissions of electromagnetic telemetry signals such that electromagnetic interference between the transmissions is minimized or reduced.

35 Claims, 19 Drawing Sheets

(51) Int. Cl.
*G01V 3/12* (2006.01)
*E21B 47/18* (2012.01)

(56) References Cited

U.S. PATENT DOCUMENTS

| | | | |
|---|---|---|---|
| 5,959,547 A * | 9/1999 | Tubel | G01V 11/002 340/853.2 |
| 6,075,462 A * | 6/2000 | Smith | E21B 47/13 340/854.6 |
| 7,145,473 B2 | 12/2006 | Wisler et al. | |
| 7,151,466 B2 | 12/2006 | Gabelmann et al. | |
| 7,170,423 B2 | 1/2007 | Wisler et al. | |
| 7,252,160 B2 | 8/2007 | Dopf et al. | |
| 7,413,018 B2 | 8/2008 | Hosie et al. | |
| 7,609,169 B2 | 10/2009 | Aiello | |
| 8,400,326 B2 | 3/2013 | Codazzi | |
| 9,638,028 B2 | 5/2017 | Gao et al. | |
| 2002/0113718 A1 * | 8/2002 | Wei | G01V 11/00 340/855.3 |
| 2007/0057811 A1 * | 3/2007 | Mehta | G01V 11/002 340/853.3 |
| 2010/0182161 A1 | 7/2010 | Robbins et al. | |
| 2013/0146279 A1 | 6/2013 | Chang et al. | |
| 2014/0266769 A1 | 9/2014 | van Zelm | |
| 2015/0337649 A1 * | 11/2015 | Donderici | G01V 3/26 340/854.5 |
| 2016/0053610 A1 | 2/2016 | Switzer et al. | |
| 2018/0335542 A1 * | 11/2018 | Jannin | G01V 3/28 |

FOREIGN PATENT DOCUMENTS

| | | |
|---|---|---|
| WO | 2016100672 A1 | 6/2016 |
| WO | 2016196246 A1 | 12/2016 |

* cited by examiner

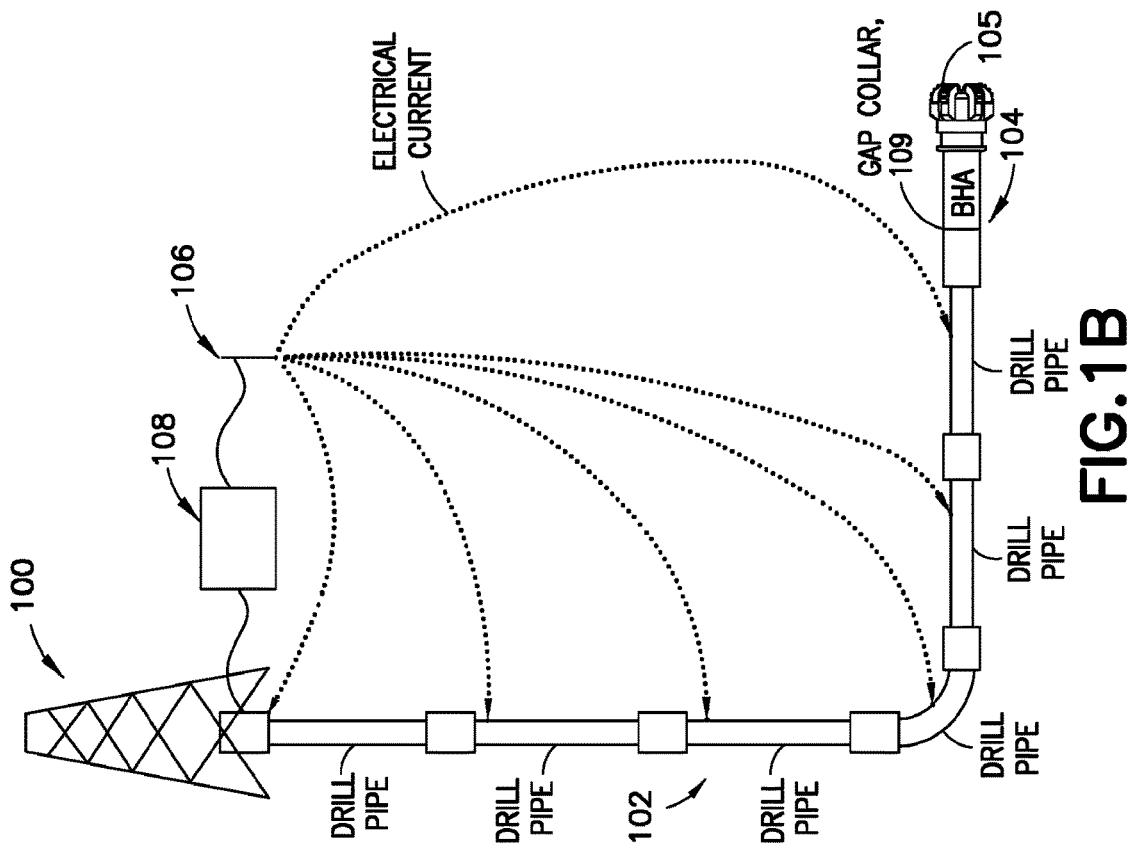
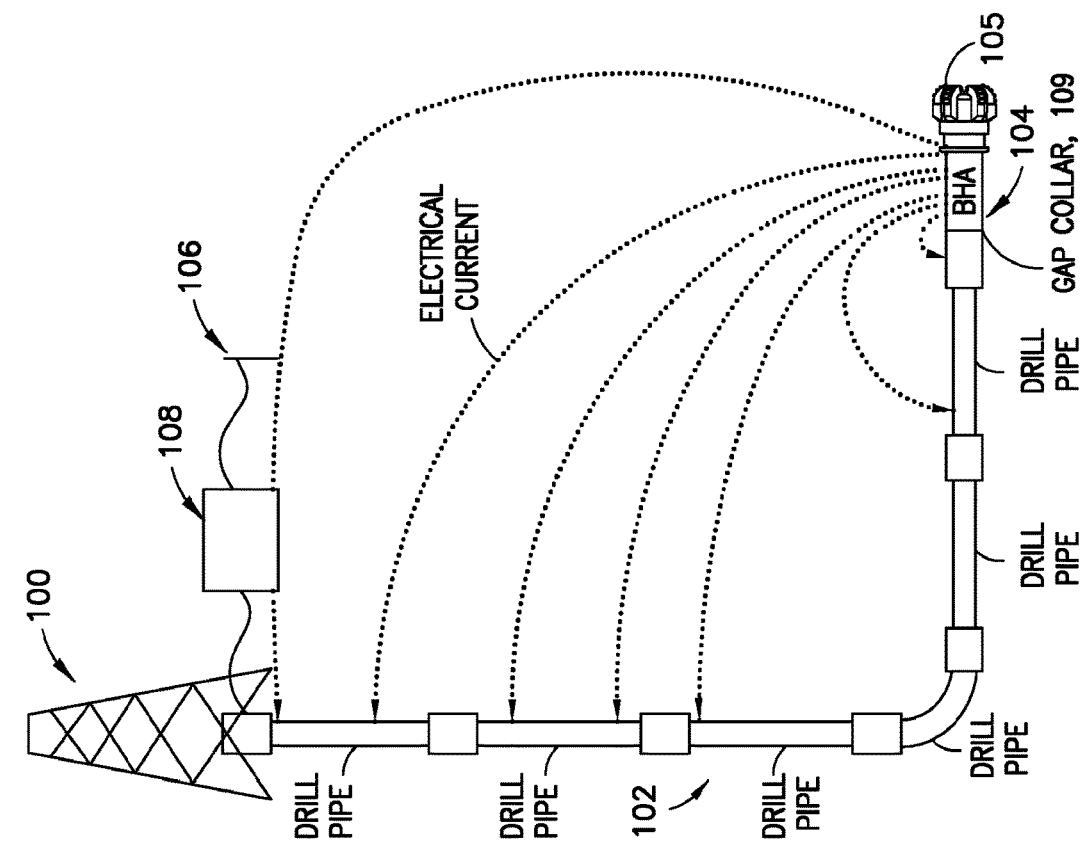

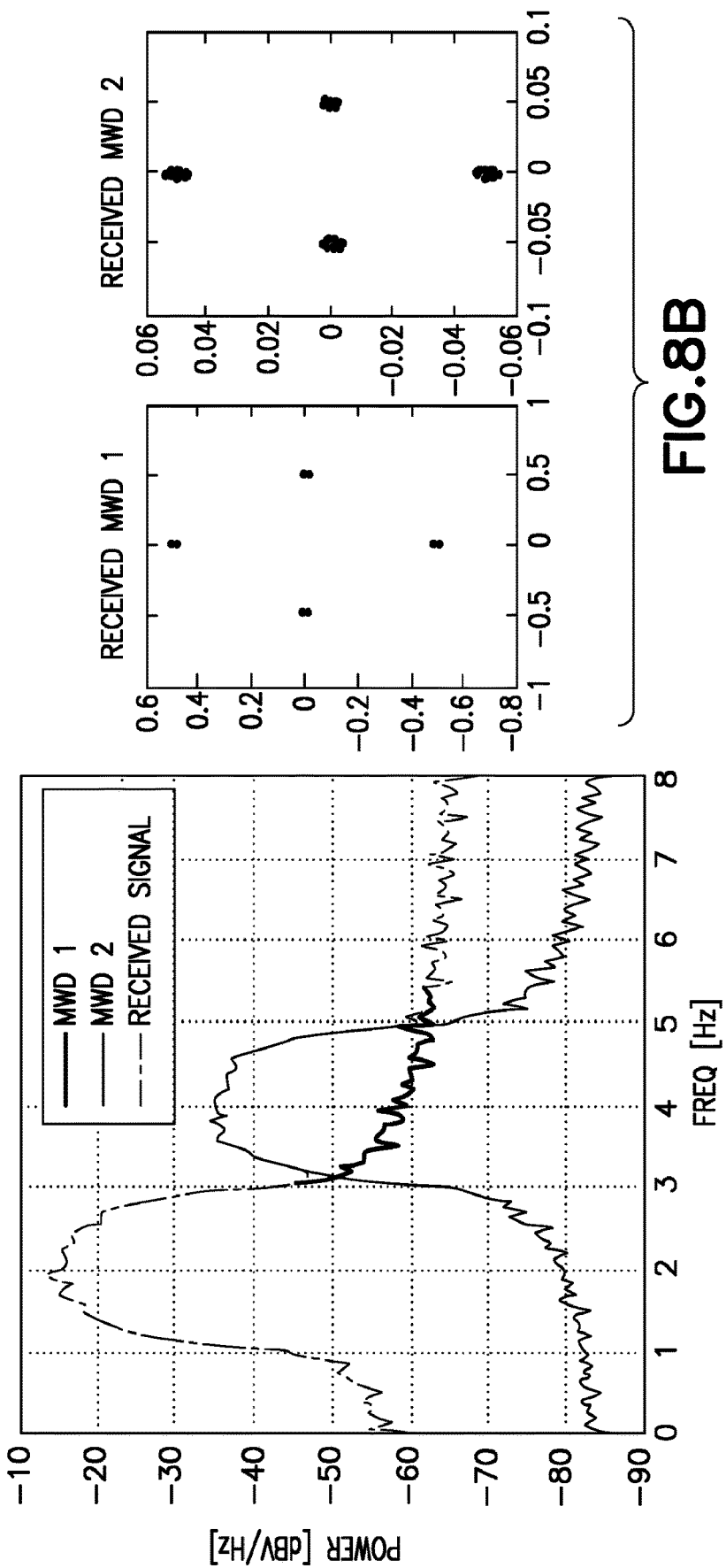

DOWNHOLE ELECTROMAGNETIC NETWORK

CROSS-REFERENCE TO RELATED APPLICATIONS

The present disclosure claims priority from U.S. Provisional Appl. No. 62/356810, filed on Jun. 30, 2016, herein incorporated by reference in its entirety.

BACKGROUND

Electromagnetic (EM) signals propagate near the speed of light. Downhole EM communication generally operates in very low frequencies (at Hertz or even sub-Hertz frequencies), and thus the corresponding wavelength is very large. For example, the wavelength can be larger than the diameter of the Earth. Therefore, at these frequencies, the effect of propagation delay on signal phase observed at multiple locations is nearly negligible. The EM signals propagate in three dimensions. It can be difficult to isolate these EM signals when there are multiple devices positioned downhole, or near the surface, that are attempting to communicate within the same region of the electromagnetic spectrum.

SUMMARY

This present disclosure provides example systems, devices, apparatus and methods that allow for controlling and coordinating the transmission of electromagnetic telemetry signals (which can carry data about a geological formation, data about operation of a downhole tool, and/or data for the control of a downhole tool) from and/or to two or more downhole tools to minimize or reduce electromagnetic interference between the transmissions. The example systems, methods, devices, and apparatus also provide signal coordination control that, in some embodiments, allows for duplex bidirectional communication of transmissions of such electromagnetic telemetry signals such that electromagnetic interference between the transmissions is minimized or reduced.

Illustrative embodiments of the present disclosure are directed to a method of communicating between a surface system and downhole tools using electromagnetic telemetry signals. The method includes communicating a plurality of electromagnetic telemetry signals between at least one surface system and the downhole tools using signal coordination control that coordinates transmission of the plurality of electromagnetic telemetry signals. The signal coordination control determines at least one unique transmitting parameter for a corresponding electromagnetic telemetry signal communicated between the at least one surface system and a respective downhole tool, wherein the at least one unique transmitting parameter controls transmission of the corresponding electromagnetic telemetry signal.

In some embodiments, the at least one unique transmitting parameter can suppress interference between the corresponding electromagnetic telemetry signal and at least one other electromagnetic telemetry signal communicated between at least one surface system and another downhole tool.

In some embodiments, the plurality of electromagnetic telemetry signals can include uplink electromagnetic telemetry signals that are transmitted by the downhole tools and propagate through a subterranean formation to at least one surface-located electrode. The at least one unique transmitting parameter can control transmission of a corresponding uplink electromagnetic telemetry signal.

In some embodiments, the at least one surface system can be configured to detect the uplink electromagnetic telemetry signals by measuring the potential difference between a pair of electrodes (or a plurality of electrode pairs) in electrical contact with the earth at locations and in a manner assuring a substantial potential difference between the two electrodes. An electrode for this application can be any of the following (but not limited to these examples): a metal (conducting) stake in the ground, a metal fence or powerline pylon, well casing, blowout preventer, rig structure, a drill string, or the wellhead or casing of another well in the vicinity of the well with the downhole tool. The at least one surface system can also be configured to detect the uplink electromagnetic telemetry signals by measuring electric field variations using toroids around a drill string, electro-chemical electrodes (e.g., Ag/AgCl electrodes are commonly used to measure electric fields in geophysical electromagnetics), and capacitive electric field sensors. The at least one surface system can also be configured to detect the uplink electromagnetic telemetry signals by measuring magnetic field variations using flux-gate magnetometers, coils wound around a magnetically permeable core material, total field magnetometers, a SQUID (superconducting quantum interference device). The at least one surface system can also be configured to detect the uplink electromagnetic telemetry signals by measuring both electric fields and magnetic fields.

In other embodiments, the at least one surface system can be configured to detect the uplink electromagnetic telemetry signals with a deep electrode system that measures the potential difference between an electrode on the surface and a point deep within the earth (e.g. a point deep down on the casing of the well in which the BHA is deployed on or on the casing of a pre-existing well).

In other embodiments, other means for detecting electromagnetic telemetry signals can be used, such as a sensor that detects the signal between a surface stake and a drill string, or between two surface stakes, or a surface stake and a downhole probe, or a downhole probe and a drill string, or two drill strings, or two downhole probes.

In some embodiments, the plurality of electromagnetic telemetry signals can include downlink electromagnetic telemetry signals that are transmitted by the least one surface system and propagate through a subterranean formation to a downhole tool. The at least one unique transmitting parameter can control transmission of a corresponding downlink electromagnetic telemetry signal. The at least one surface system can be configured to transmit the downlink electromagnetic telemetry signals by injecting current between two conducting electrodes connected to the earth. An electrode for this application can be any of the following (but not limited to these examples): a metal (conducting) stake in the ground, a metal fence or powerline pylon, well casing, blowout preventer, rig structure, a drill string, or the wellhead or casing of another well in the vicinity of the well with the downhole tool.

In some embodiments, the plurality of electromagnetic telemetry signals can carry data comprising at least one of (i) a geological formation parameter measured by a downhole tool and (ii) at least one operational parameter for a downhole tool.

In some embodiments, the at least one unique transmitting parameter can include a timing protocol, a frequency parameter, an amplitude parameter, a phase parameter, a pulse shape parameter, a spectral shape parameter, a code-modulation sequence parameter, a space-time parameter, a space-frequency parameter, a time-frequency parameter, a modulation type parameter, an error correcting code parameter, and/or a data rate parameter.

In some embodiments, uplink electromagnetic telemetry signals are transmitted from the downhole tools to the at least one surface system. Each downhole tool can be associated with at least one unique transmitting parameter so that the uplink electromagnetic telemetry signals transmitted by each downhole tool can be received at the at least one surface system using the at least one unique transmitting parameters with minimal or reduced interference between the uplink electromagnetic telemetry signals.

In some embodiments, downlink electromagnetic telemetry signals are transmitted from the least one surface system to the downhole tools. At least one unique transmitting parameter can be used to control the transmission of the downlink electromagnetic telemetry signals so that the downlink electromagnetic telemetry signals can be received by the downhole tools using the at least one unique transmitting parameters with minimal or reduced interference between the downlink electromagnetic telemetry signals.

In some embodiments, a number of surface systems are used and each surface system is associated with a respective downhole tool. Each surface system can be associated with a unique transmitting parameter so that downlink electromagnetic telemetry signals transmitted by a surface system can be received at a respective downhole tool using the unique transmitting parameter.

In some embodiments, the surface system and the downhole tools transmit electromagnetic telemetry signals using duplex bidirectional communication.

In some embodiments, the unique transmitting parameter includes a timing protocol and the signal coordination control specifies a data transmission sequence that uses a different timing protocol for each downhole tool. The data transmission sequence can be communicated from the at least one surface system to the downhole tools.

In some embodiments, the downhole tools are drilling tools.

In some embodiments, the signal coordination control applies a frequency division duplexing process or a frequency division multiple access process to the electromagnetic telemetry signals.

In some embodiments, the signal coordination control applies a time division duplexing process or a time division multiple access process to the electromagnetic telemetry signals.

In some embodiments, the signal coordination control applies an orthogonal frequency division multiplexing (OFDM) process, a filtered OFDM process, a discrete wavelet transform OFDM process, or a code division multiple access process to the electromagnetic telemetry signals.

In some embodiments, the method further includes determining the unique transmitting parameter using previous transmission of electromagnetic telemetry signals between a surface system and one or more of the downhole tools.

Various embodiments of the present disclosure are also directed to a system for electromagnetic telemetry. The system includes downhole tools and at least one surface system that includes a processing system. The processing system performs a signal coordination control function that coordinates the transmission of a plurality of electromagnetic telemetry signals communicated between at least one surface system and the downhole tools. The signal coordination control function determines at least one unique transmitting parameter for a corresponding electromagnetic telemetry signal communicated between the at least one surface system and a respective downhole tool, wherein the at least one unique transmitting parameter controls transmission of the corresponding electromagnetic telemetry signal.

In some embodiments, the downhole tool is a drilling tool.

In various examples, the at least one unique transmitting parameter can be at least one of: a timing, a frequency, an amplitude, a phase, a pulse shape or spectral shape, a code-modulation sequence, a space-time or space-frequency, a time-frequency, a modulation type, an error correcting code, or a data rate, of the transmission of electromagnetic telemetry signals communicated from and/or to each respective downhole tool.

System, methods, and computer-readable media are described for controlling uplink and/or downlink of electromagnetic telemetry signals communicated from and/or to each respective downhole tool, to cause duplex bidirectional communication with minimized interference.

At least one computer-readable storage medium is provided herein. The at least one computer-readable storage medium is encoded with instructions that, when executed using at least one processor unit described herein, causes a system to perform the steps of the procedures described herein.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

One of ordinary skill in the art will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 1A and 1B show examples of transmission of uplink EM telemetry signals and downlink EM telemetry signals, respectively, according to principles of the present disclosure.

FIGS. 8A and 8B show the example pulse shaped spectrums of two EM telemetry signals, according to principles of the present disclosure.

DETAILED DESCRIPTION

Figure 2:
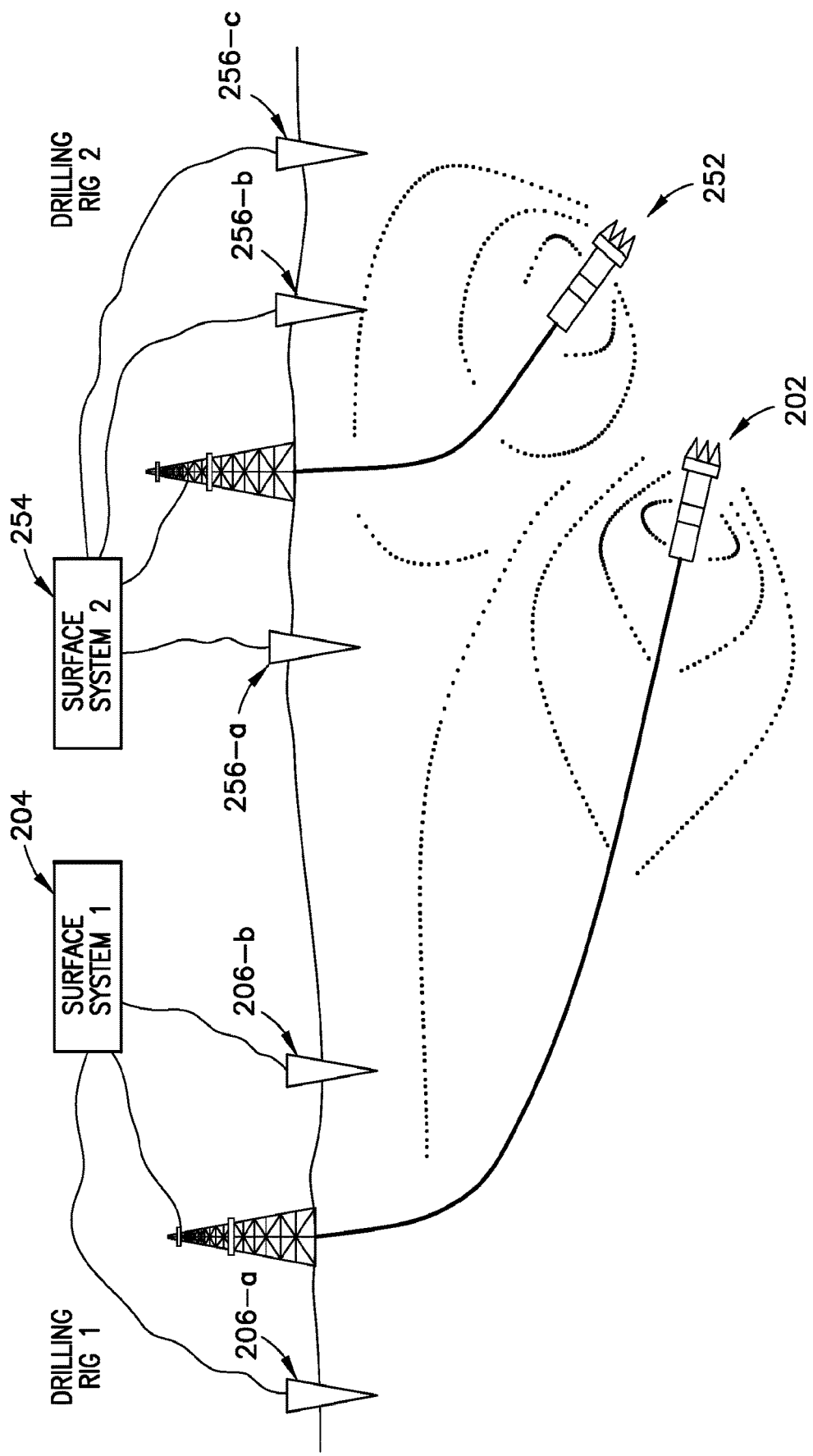
FIG. 2 shows an example of components and positioning of drilling rigs, according to principles of the present disclosure.

Following below are more detailed descriptions of various concepts related to, and embodiments of, systems, devices, apparatus and methods that allow for controlling and coordinating the transmission of data from and to two or more downhole tools to minimize interference between the transmissions. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to, the term "including" means including but not limited to. The term "based on" means based at least in part on.

With respect to surfaces described herein in connection with various examples of the principles herein, any references to "top" surface and "bottom" surface are used primarily to indicate relative position, alignment and/or orientation of various elements/components with respect to the substrate and each other, and these terms do not necessarily indicate any particular frame of reference (e.g., a gravitational frame of reference). Thus, reference to a "bottom" of a surface or layer does not necessarily require that the indicated surface or layer be facing a ground surface. Similarly, terms such as "over," "under," "above," "beneath" and the like do not necessarily indicate any particular frame of reference, such as a gravitational frame of reference, but rather are used primarily to indicate relative position, alignment and/or orientation of various elements/components with respect to the surface, and each other.

The terms "disposed on" and "disposed over" encompass the meaning of "embedded in," including "partially embedded in." In addition, reference to feature A being "disposed on," "disposed between," or "disposed over" feature B encompasses examples where feature A is in contact with feature B, as well as examples where other layers and/or other components are positioned between feature A and feature B.

FIGS. 1A and 1B show non-limiting examples of a drilling rig 100 that employs a downhole electromagnetic (EM) telemetry system. The drilling rig includes a drill string 102 (including a number of drill pipe sections) that extends to a bottom hole assembly (BHA) 104 with a drill bit 105. The drill string 102 can be routed through a surface-located blow-out preventer (not shown) as is well known. The drill bit 105 is operated to bore through the rock of a geological formation to form a borehole that extends into the geological formation. A surface-located stake sensor 106 is positioned sufficiently far from the drilling rig 100. A surface system 108 is electrically coupled to the surface-located blow-out preventer and to the stake sensor 106. In embodiments, the surface system 108 (including the blow-out preventer and the stake sensor 106) can operate as an EM transceiver that can receive EM telemetry signals (uplink EM telemetry signals) transmitted by the BHA 104 and that can transmit EM telemetry signals (downlink EM telemetry signals) to the BHA 104. Similarly, the BHA 104 can operate as an EM transceiver that can receive EM telemetry signals (downlink EM telemetry signals) transmitted by the surface system 108 and that can transmit EM telemetry signals (uplink EM telemetry signals) to the surface system 108.

As a non-limiting example, the BHA 104 may also include a downhole measurement-while-drilling (MWD) tool and/or sensors and/or a logging-while-drilling (LWD) tool. The uplink EM telemetry signals can carry information acquired by the measurement-while-drilling (MWD) tool and/or sensors and/or the logging-while-drilling (LWD) tool. The downlink EM telemetry signals can carry commands for controlling the operation of the measurement-while-drilling (MWD) tool and/or sensors and/or the logging-while-drilling (LWD) tool. While various examples herein are described relative to a MWD tool, the examples also can apply to a LWD tool.

In embodiment(s), the term "geological formation" encompasses the rock and other materials that can be detected using a measurement made in the borehole, such as but not limited to a log or a well test. As such, it may include the well bore, and the drilling fluid contained therein. Furthermore, the uplink EM signals can carry information related to geological formation parameters measured by a downhole tool or sensor of the BHA 104 where such geological formation parameters are indicative of properties of the geological formation and/or extrapolation of those properties beyond the measurement volume. In particular, the geological formation parameters can be indicative of one or more of a physical property, a mechanical property, a chemical property, an optical property, an electrical property, a magnetic property, or other property of the geological formation.

In other embodiments, the surface system 108 can be configured to detect the uplink electromagnetic telemetry signals by measuring the potential difference between a pair of electrodes (or a plurality of electrode pairs) in electrical contact with the earth at locations and in a manner assuring a substantial potential difference between the two electrodes. See U.S. Pat. No. 4,181,014 (particularly column 2, line 6). An electrode for this application can be any of the following (but not limited to these examples): a metal (conducting) stake in the ground, a metal fence or powerline pylon, well casing, blowout preventer, rig structure, a drill string, or the wellhead or casing of another well in the vicinity of the well with the downhole tool. In embodiments, the surface system 108 can detect the uplink electromagnetic telemetry signals using a plurality of electrode pairs, which is described in PCT Publ. No. WO2016/196246.

The surface system 108 can also be configured to detect the uplink electromagnetic telemetry signals by measuring electric field variations using toroids around a drill string (See U.S. Pat. Nos. 4,181,014; and 7,170,423), electrochemical electrodes (e.g., Ag/AgCl electrodes are commonly used to measure electric fields in geophysical electromagnetics), and capacitive electric field sensors. The surface system 108 can also be configured to detect the uplink electromagnetic telemetry signals by measuring magnetic field variations using flux-gate magnetometers, coils wound around a magnetically permeable core material, total field magnetometers, a SQUID (superconducting quantum interference device). The surface system 108 can also be configured to detect the uplink electromagnetic telemetry signals by measuring both electric fields and magnetic fields, which is described in U.S. Pat. Nos. 7,609,169; and 7,151,466.

In other embodiments, the surface system 108 can be configured to detect the uplink electromagnetic telemetry signals with a deep electrode system that measures the potential difference between an electrode on the surface and a point deep within the earth (e.g., a point deep down on the casing of the well in which the BHA is deployed on or on the casing of a pre-existing well), which is described in U.S. Pat. Nos. 4,181,014; 7,145,473; 7,413,018; 8,400,326 and 9,638,028; and in PCT patent applications WO2016/100672; and WO2016/196246.

FIG. 1A shows an example of the uplink EM telemetry signals transmitted by the BHA 104 to the surface system 108. The BHA 104 includes a gap collar (or gap sub) 109 together with a downhole EM communications unit (not shown) as is well known. The gap collar 109 provides for electrical isolation between an upper and lower part of the BHA 104 and thus forms a type of dipole antenna (see U.S. Pat. No. 7,252,160) that can be used for transmission or reception of EM telemetry signals. The downhole EM communication unit of the BHA 104 includes a transmitter that can be configured to induce a modulated EM wave by forcing a time-varying potential difference across the gap collar 109. The dotted lines in FIG. 1A illustrate lines of current that flow from the BHA 104 through the drill string 102 and through the geological formation (surrounding the drill string 02). At the surface, the surface system 108 measures the time-varying potential difference between two electrodes (as antennae) to obtain the uplink EM telemetry signals transmitted by the downhole EM communications unit of the BHA 104. An alternative downhole system uses a toroid around the drill string for transmission or reception of EM telemetry signals, which is described in U.S. Pat. No. 2,411,696.

FIG. 1B shows an example of the downlink EM telemetry signals transmitted by the surface system 108 to the BHA 104. In this example, the reverse process is performed by the surface system 108 injecting current between two conducting electrodes connected to the earth. An electrode for this application can be any of the following (but not limited to these examples): a metal (conducting) stake in the ground, a metal fence or powerline pylon, well casing, blowout preventer, rig structure, a drill string, or the wellhead or casing of another well in the vicinity of the well with the downhole tool. The dotted lines in FIG. 1B illustrate lines of current flowing from the stake sensor 106 and through the geological formation (in the opposite sense to that shown in FIG. 1A). The downhole EM communications unit of the BHA 104 employs receiver circuitry that can be configured to measure the time-varying potential difference across the gap collar 109 to obtain the downlink EM telemetry signals transmitted by the surface system 108. In other embodiments, the ground contact electrodes used to inject current for the downlink EM telemetry signals can be different that the ground contact electrodes used to detect the uplink EM telemetry signals.

The uplink and downlink EM telemetry signals operate at relatively low frequencies, for example, on the order of Hertz or even sub-Hertz frequencies. Due to the very large corresponding wavelength at these frequencies, i.e., wavelengths comparable to or larger than the diameter of the earth, the effect of propagation delay on the signal phase for signals originating from multiple locations is nearly negligible. While it is highly dependent on the type and composition of the geological formation, the induced EM field of the uplink and downlink EM telemetry signals propagates in a substantially three-dimensional distribution from the point of origin. Due to the EM signals from the 3-D data transmission propagation, it is difficult to isolate the point of origin of communication when there are multiple devices downhole or near the surface that attempt to communicate within the same frequency range of the electromagnetic spectrum. There does not appear to be technology in use in the field that effectively focuses or contains the induced EM fields. As a result, interference may occur between the EM telemetry signals from adjacent rig operations, where the transmission signals can interfere with each other. There is no existing technology to control the transmissions from the rigs to effectively minimize (including suppress) an interference between the transmissions of the uplink and downlink EM telemetry signals.

The example systems methods and apparatus described herein can be used to effectively and reliably enable simultaneous operation of EM telemetry systems in the same vicinity. While the examples are described relative to telemetry systems for drilling systems, such as LWD systems and MWD systems, the technique can be applied to other types of downhole systems.

FIG. 2 shows an example of two nearby drilling rigs, each running a drilling operation. The first drilling rig includes a downhole BHA 202 with an EM telemetry device that includes a gap collar and downhole EM communications unit supporting communication of both uplink and downlink EM telemetry signals as described above with respect to FIGS. 1A and 1B. A corresponding surface system 204 employs one or more electrode pairs (which can include the stake sensors 206-a and 206-b as part of respective electrode pairs) to support communication of both uplink and downlink EM signals as described above with respect to FIGS. 1A and 1B. The second drilling rig also includes a downhole BHA 252 with an EM telemetry device that includes a gap collar and downhole EM communications unit supporting communication of both uplink and downlink EM telemetry signals as described above with respect to FIGS. 1A and 1B. A corresponding surface system 254 employs one or more electrode pairs (which can include the stake sensors 256-a, 256-b and 256-c as part of respective electrode pairs) to support communication of both uplink and downlink EM telemetry signals as described above with respect to FIGS. 1A and 1B.

The dotted lines in FIG. 2 shows an example of the induced EM field of the uplink EM telemetry signals that can be generated from the EM telemetry devices of the respective BHAs 202 and 252. As shown, since the uplink EM telemetry signals have substantially three-dimensional distributions from the point of origin (BHAs 202 and 252), they can interfere with one other prior to being measured at the surface systems 204 corresponding to respective first and second drilling rigs.

The downhole EM telemetry systems are generally bi-directional (i.e., involving the communication of both uplink and downlink EM telemetry signals). The surface systems and corresponding downhole EM communications units of the respective BHAs are generally half-duplex, such that at any given point in time they can either transmit or receive, but not both at the same time. Given the 3-D propagation of the EM telemetry signals, the signals from the two drill operations can interfere with each other, both for the uplink and downlink EM telemetry signals.

In signal processing, a signal cannot have arbitrarily compact time nor frequency footprint. Even if two uplink EM telemetry signals from two EM telemetry transmitters are assigned two different frequencies, the out-of-band energy from the two transmitters may still interfere with each other.

Figure 3:
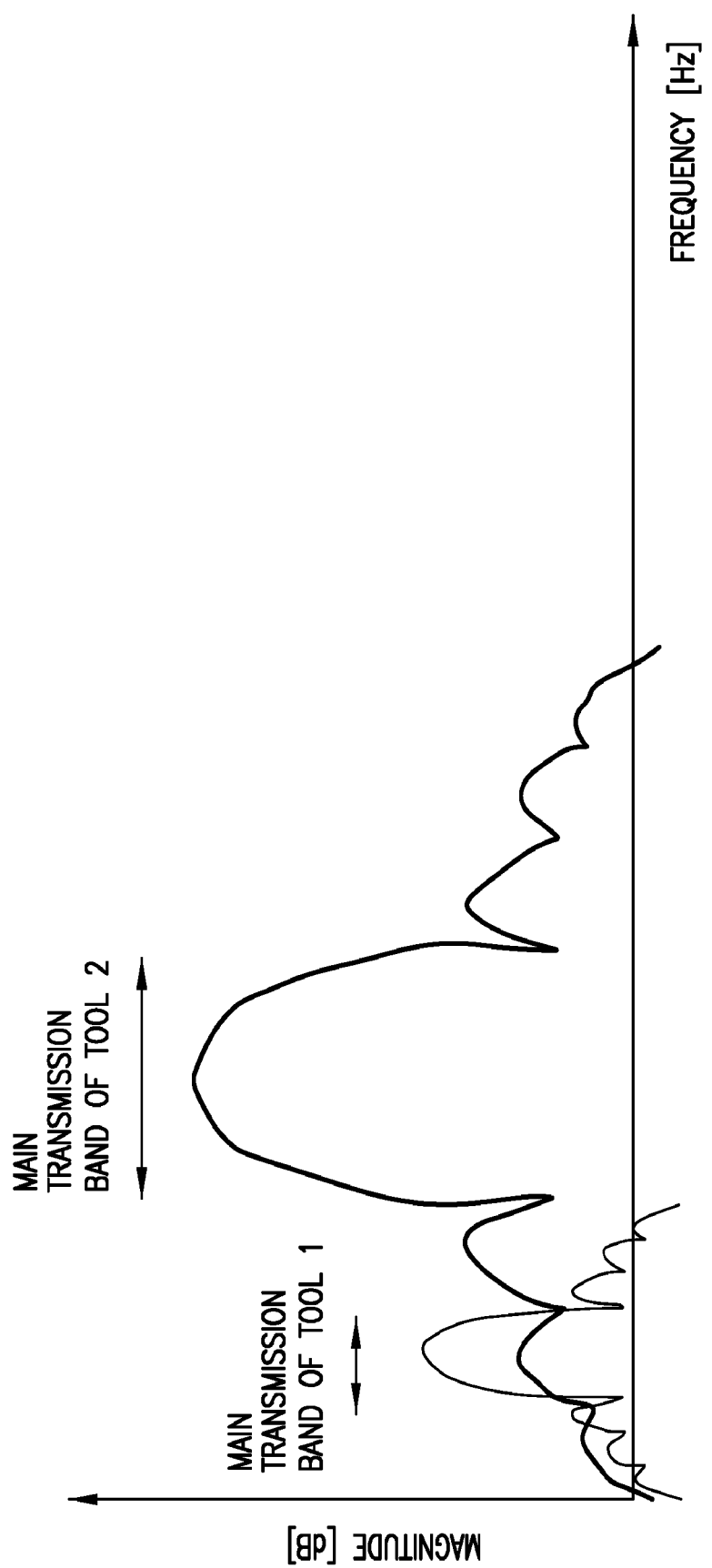
FIG. 3 shows an example spectrum of uplink EM telemetry signals received from two nearby downhole tools, according to principles of the present disclosure.

FIG. 3 shows an example spectrum of the uplink EM telemetry signals received at a surface when the downhole EM communications units of two respective BHAs (Tool 1 and Tool 2) are transmitting. In this example, two different frequencies and bandwidths are assigned to the two transmitters, effectively using frequency multiplexing to enable two simultaneous transmissions. With pulse shaping and other signal design techniques, the energy outside the main transmission band of Tool 2 could be suppressed. However, if Tool 1 is going deeper into the geological formation, or is in a difficult or dense formation, the received signal from Tool 1 at the surface may be significantly smaller than the signal of Tool 2. As a result, the signal-to-noise ratio (SNR) of the signal from Tool 2 is significantly diminished due to the interference of the out of band energy of Tool 1's signal.

The example systems methods and apparatus described herein provide for controlling the transmission of the EM telemetry signals from and/or to the two or more downhole BHAs or tools, such that any interference between the EM telemetry signals is effectively minimized (including being suppressed).

As a non-limiting example, the systems, devices, apparatus and methods can be used for controlling transmission of data from multiple locations, and decoding the transmissions, such that interference is minimized. Using the example systems, methods, and apparatus described herein, multiple devices within close physical proximity in a drilling operation can be caused to communicate in the same or nearby frequency bands.

In a non-limiting example, a signal controlling component is provided that allows for controlling uplink and/or downlink EM telemetry signals that are transmitted or received by a downhole BHA or tool. The signal controlling component can be coupled to a surface system, or the EM communications unit of the downhole BHA or tool, or both, for controlling the transmission of uplink and/or downlink EM telemetry signals that are transmitted or received by a downhole BHA or tool, such that any interference between the uplink and/or downlink EM telemetry signals of nearby downhole EM telemetry systems is effectively minimized (including being suppressed). In embodiment(s), the signal control component can be configured to determine one or more unique transmission parameters that are used control the transmission of the uplink and/or downlink EM telemetry signals that are transmitted or received by a downhole BHA or tool, such that any interference between the uplink and/or downlink EM telemetry signals of nearby downhole EM telemetry systems is effectively minimized (including being suppressed).

In examples according to the principles herein, the uplink and downlink EM telemetry signals can carry (i) data indicative of at least one geological formation parameter, measured using one or more downhole BHAs or tools, or (ii) data indicative of at least one operational parameter of one or more downhole BHAs or tools, or (iii) both types of data (i.e., data indicative of at least one geological formation parameter and data indicative of at least one operation parameter). Non-limiting examples of operational parameters include data indicative of the location the drill is operating in, operational parameters of the downhole tools, and orientation data (e.g., including data indicating the orientation of the drill string or other portion of the downhole tool).

Figure 4:
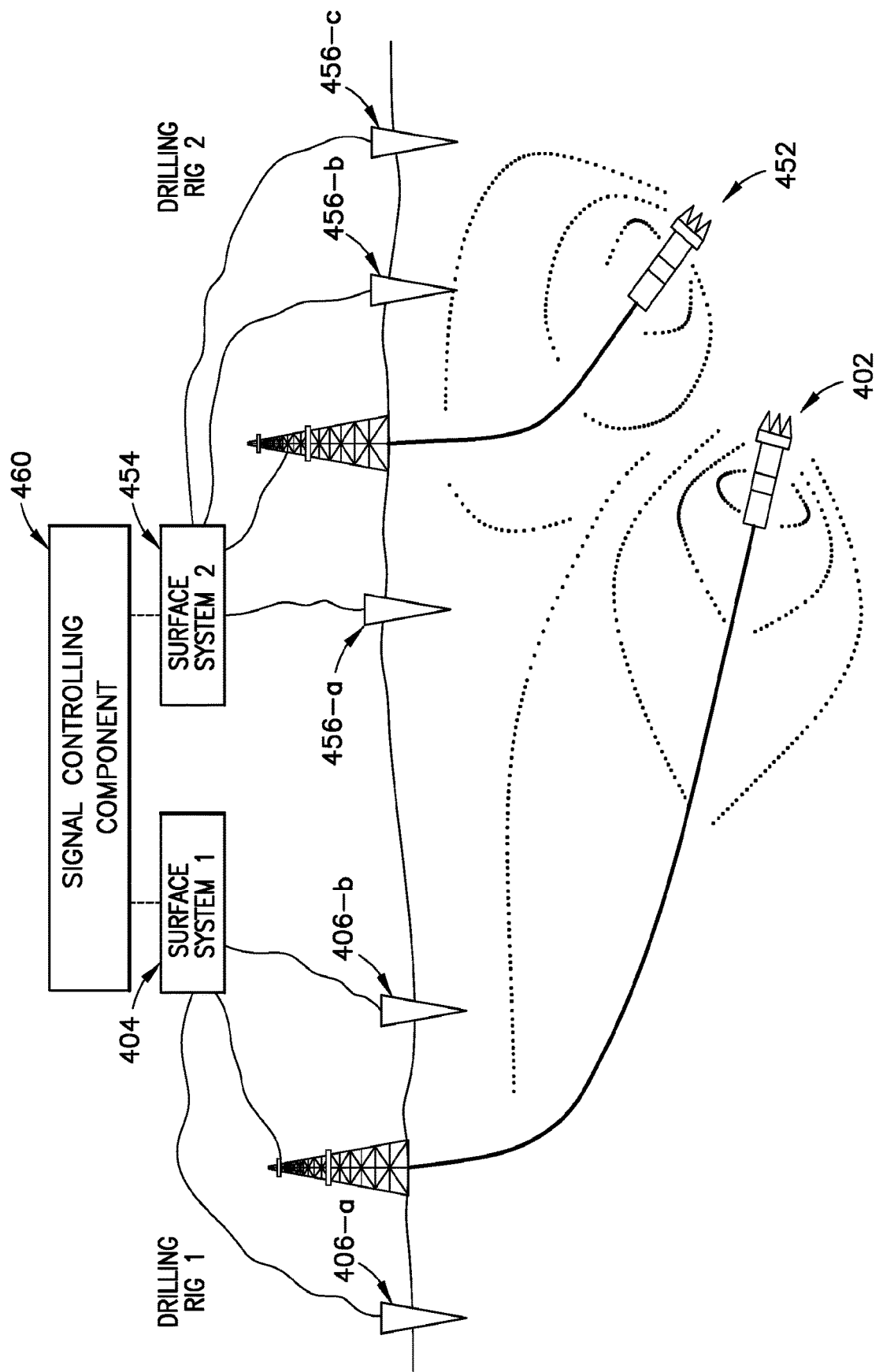
FIG. 4 shows an example signal controlling component, according to principles of the present disclosure.

FIG. 4 shows a non-limiting example signal controlling component 460 that can be coupled to the surface systems 404 and 454 of two drilling rigs (Drilling Rig 1 and Drilling Rig 2). Each drilling rig includes a downhole BHA or tool (402 or 452) with an EM telemetry device that includes a gap collar and downhole EM communications unit supporting communication of both uplink and downlink EM telemetry signals as described above with respect to FIGS. 1A and 1B. The surface system 404 of Drilling Rig 1 is coupled to one or more electrode pairs (which can include stakes 406-a and 406-b) to support communication of both uplink and downlink EM telemetry signals as described above with respect to FIGS. 1A and 1B. The surface system 454 of Drilling Rig 2 is coupled to one or more electrode pairs (which can include stakes 456-a, 456-b and 456-c) to support communication of both uplink and downlink EM telemetry signals as described above with respect to FIGS. 1A and 1B. A signal controlling component 460 is coupled to both the surface system 404 of Drilling Rig 1 and to the surface system 454 of Drilling Rig 2. The signal controlling component 460 can be used for controlling the uplink and/or downlink EM telemetry signals that are transmitted or received by the downhole BHAs or tools 402, 452 (or any number of drilling rigs).

In other examples, the signal controlling component 460 can be coupled to the EM communications units of the downhole BHAs or tools 402, 452, or coupled to at least one surface system and at least one EM communications unit of a downhole BHA or tool.

In yet other examples, the signal controlling component 460 can be configured to receive the data indicative of transmitting parameters of the uplink and/or downlink EM telemetry signals that are transmitted or received by the downhole BHAs or tools 402, 452 via an external computing device, and/or via a network, and/or via the cloud (such as but not limited to a server of a data center). For example, the stake sensor, and/or the downhole tool, and/or the at least one surface system of a drilling rig can be configured to transmit data to a network and/or the cloud (such as but not limited to a server of a data center).

In yet another example, the signal controlling component 460 can be configured to receive the data indicative of transmitting parameters of the uplink and/or downlink EM telemetry signals that are transmitted or received by the downhole BHAs or tools 402, 452 using a component of Drilling Rig 2, but transmitted (including being relayed) using at least one component of Drilling Rig 1.

In yet another example, the signal controlling component 460 can be configured to receive the data indicative of transmitting parameters of the uplink and/or downlink EM telemetry signals that are transmitted or received by the downhole BHAs or tools 402, 452 via any combination of a network, an external computing device, the cloud, a surface system, or a downhole tool.

The example systems, methods, and apparatus described herein, including the signal controlling component, can be used for establishing a downhole network for efficient bi-directional communication with at least two downhole EM telemetry devices operating simultaneously.

Figure 5:
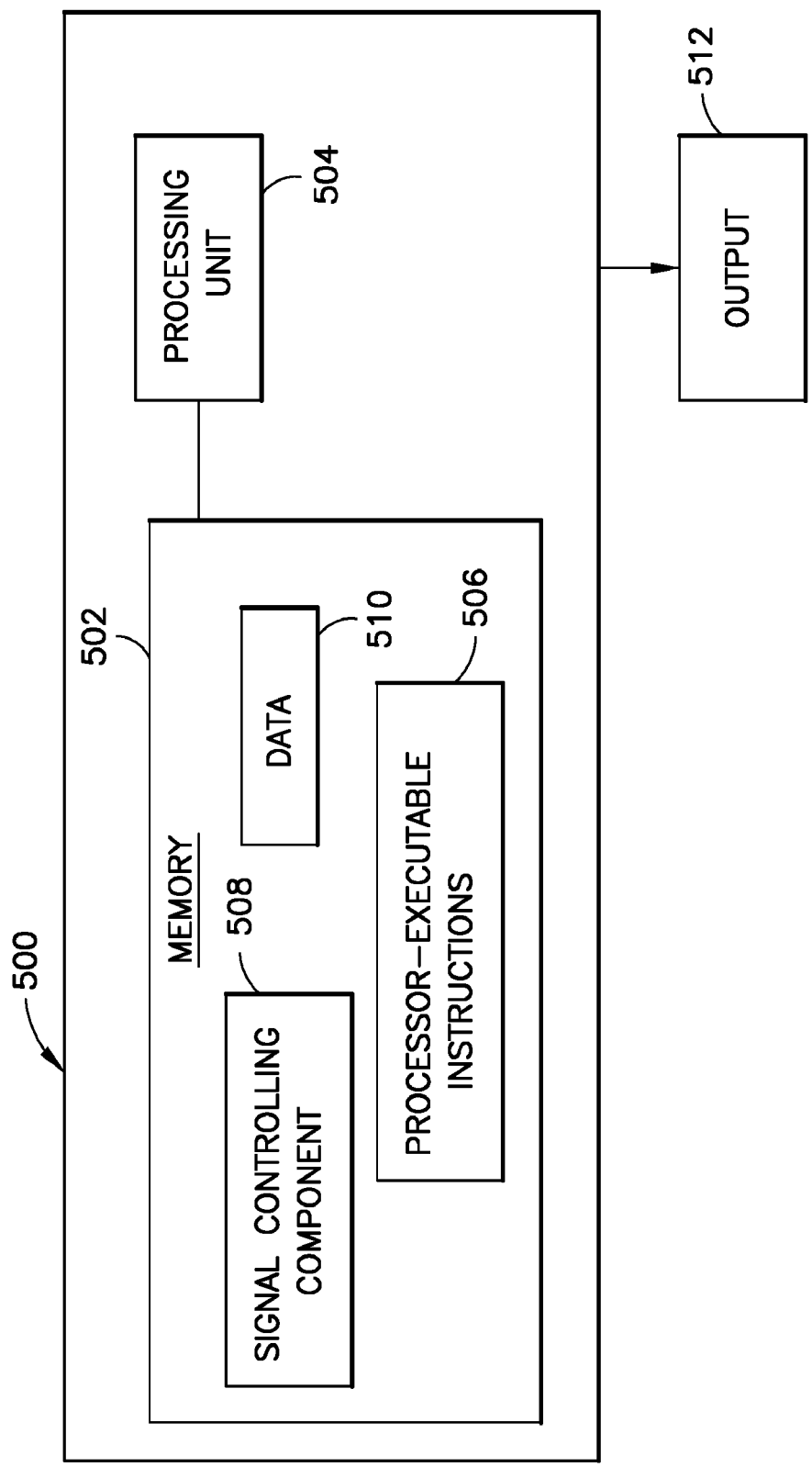
FIG. 5 is a block diagram showing an example computing device, according to principles of the present disclosure.

FIG. 5 shows an example apparatus 500 according to the principles herein that can be used as a signal controlling component for controlling the transmission of EM telemetry signals from and/or to the two or more downhole tools. The example apparatus 500 includes at least one memory 502 and at least one processing unit 504. The at least one processing unit 504 is communicatively coupled to the at least one memory 502.

Example memory 502 can include, but is not limited to, hardware memory, non-transitory tangible media, magnetic storage disks, optical disks, flash drives, computational device memory, random access memory, such as but not limited to DRAM, SRAM, EDO RAM, any other type of memory, or combinations thereof. Example processing unit 504 can include, but is not limited to, a microchip, a processor, a microprocessor, a special purpose processor, an application specific integrated circuit, a microcontroller, a field programmable gate array, any other suitable processor, or combinations thereof.

The at least one memory 502 is configured to store processor-executable instructions 506 and a signal controlling component 508. In a non-limiting example, the signal controlling component 508 can be used to compute a data transmission sequence that specifies a sequence of transmission of EM telemetry signals from and/or to each downhole tool, such that interference between such transmissions from and/or to the two or more downhole tools is minimized. In another non-limiting example, the signal controlling component 508 can be used to analyze the transmission of M telemetry signals to determine transmitting parameters of the transmission, such as but not limited to at least one of: a timing, a frequency, an amplitude, a phase, a pulse shape or spectral shape, a code-modulation sequence, a space-time or space-frequency, a time-frequency, a modulation type, an error correcting code, or a data rate, of the transmission. As shown in FIG. 5, the memory 502 also can be used to store data 510, such as but not limited to the data indicative of the data transmission sequence, or data indicative of the transmitting parameters of the transmission.

In a non-limiting example, the at least one processing unit 504 executes the processor-executable instructions 506 stored in the memory 502 at least to determine the data indicative of the transmission sequence using the signal controlling component 508. The at least one processing unit 504 also executes processor-executable instructions 506 to control a transmission unit (which can be part of a downhole BHA or tool or part of a surface system) to transmit EM telemetry signals based on the data transmission sequence and/or controls the memory 502 to store the data transmission sequence. The data transmission sequence can include one or more unique transmission parameters that are used to control the transmission of the EM telemetry signals that are transmitted or received by a downhole BHA or tool, such that any interference with the EM telemetry signals of nearby downhole EM telemetry systems is effectively minimized (including being suppressed).

In another non-limiting example, the at least one processing unit 504 executes the processor-executable instructions 506 stored in the memory 502 at least to apply a signal coordination control of duplex bi-directional communication of EM telemetry signals, such that an interference between the transmission of the EM telemetry signals from and/or to the two or more downhole BHAs or tools is minimized. The at least one processing unit 504 also executes processor-executable instructions 506 to control the transmission of EM telemetry signals as dictated by the signal coordination control.

Figure 6B:
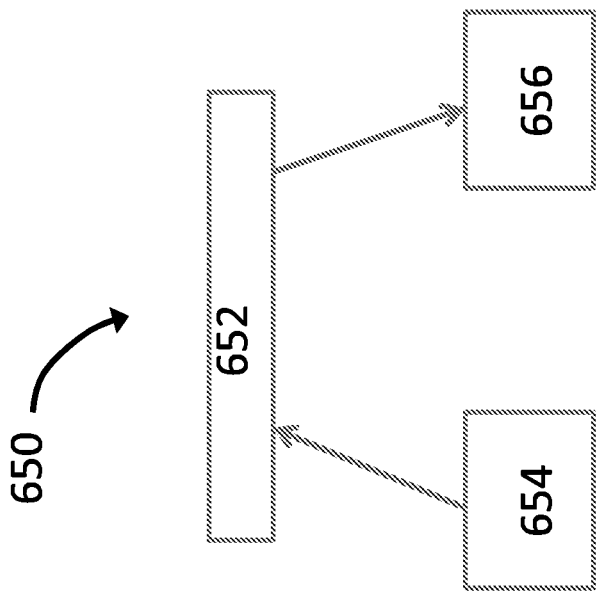
FIGS. 6A and 6B show different configurations of example systems, according to principles of the present disclosure.
Figure 6A:
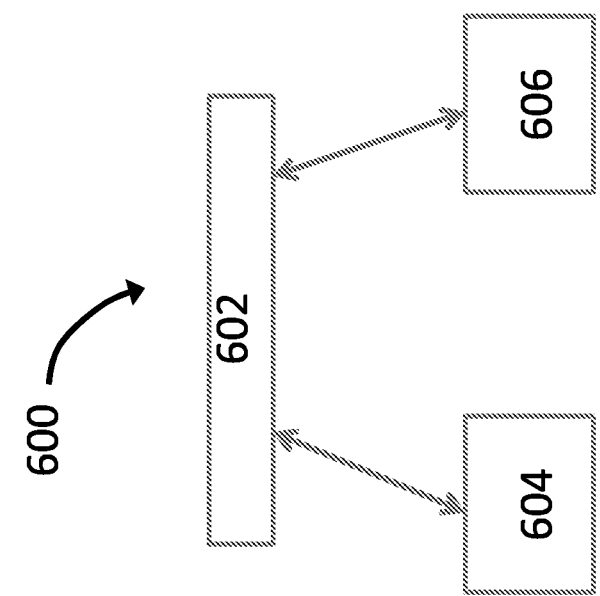

FIGS. 6A and 6B show different configurations of example systems that can be used to implement a signal coordination control of the communication of EM telemetry signals, such that interference between the transmission of the EM telemetry signals from and/or to the two or more downhole BHAs or tools is minimized (including being suppressed). Each of the systems includes a surface system coupled to a downhole BHA or tool. The systems can also include any of the other system components described herein.

FIG. 6A illustrates an example system 600 involving the centralized operation of an example signal controlling component 602 that is coupled to separate downhole EM telemetry systems 604 and 606. In operation, the signal controlling component 602 centrally controls the communication of EM telemetry signals, such that an interference between the transmission of the EM telemetry signals from and/or to the two or more downhole BHAs or tools is minimized (including being suppressed).

The example system 600 can include a signal controlling component 602 that is configured to receive data indicative of transmitting parameters of the EM telemetry signals transmitted from and/or to the two or more downhole BHAs or tool. The EM telemetry signals can carry information indicative of measurements of: (i) at least one geological formation parameter, or (ii) at least one operation parameter, or (iii) a combination of both (i) and (ii). The transmitting parameters (e.g., unique transmitting parameters) of the EM telemetry signals can be, but is not limited to, one or more of a timing protocol, a frequency, an amplitude, a phase, a pulse shape or spectral shape, a code-modulation sequence, a space-time or space-frequency, a time-frequency, a modulation type, an error correcting code, or a data rate, of the transmission of the data from each of the downhole tools. A processing unit of the signal controlling component 602 can be programmed to compute a data transmission sequence using the transmitting parameters. The transmission sequence would specify the sequence of transmissions from each of the downhole tools to effectively minimize (including suppress) the interference between the EM telemetry signal transmissions from and/or to the two or more downhole tools. The signal controlling component 602 can be configured to transmit instructions that cause the EM communication units of the downhole tools to transmit the data according to the data transmission sequence. The downhole tools can include receiving units to receive the instructions for the data transmission sequence.

The example signal controlling component 602 can be used in various example implementations to control the two or more drilling operations as a centralized component to coordinate their uplink and downlink transmissions, to effectively minimize (including suppress) any interference between the transmissions. As a non-limiting example, the signal controlling component 602 can be used to coordinate the timing of multiple surface systems, such as but not limited to, by locking onto a stable global positioning system (GPS) or atomic time reference, or estimating relative clock offsets. Based on the transmission sequence determined using the signal controlling component 602, the surface system of each drilling operation can downlink to their respective tools and thus coordinate timing and transmission of data. As another non-limiting example, the signal controlling component 602 can be used to estimate timing and clock offset between each downhole tool and its respective surface system, to control and coordinate the uplink and downlink transmissions. As another non-limiting example, the signal controlling component 602 can be used to generate a reference signal that is transmitted from a surface transmitter that all downhole tools within its range, to be used as a timing or frequency reference. This reference signal could be a continuous pilot tone, or a time bounded, possibly modulated, signal. The downhole tools can include a highly accurate clock, e.g., an atomic or temperature-compensated clock, to improve the timing accuracy, stability, and predictability of the response based on the signal from the signal controlling component 602.

The example signal controlling component 602 also can be used in various example implementations to control the transmissions from and/or to the two or more downhole EM telemetry systems as a centralized component to enable full duplex bi-directional communication.

Example system 650 of FIG. 6B illustrates the indirect operation of an example signal controlling component 652 that is coupled to separate downhole EM telemetry systems 654 and 656. In operation, the signal controlling component 652 controls the transmitting parameters for the downhole EM telemetry system 656, based on the transmitting parameters for the downhole EM telemetry system 654, such that any interference between the EM telemetry signals from and/or to the two or more downhole BHAs or tools of the two systems is effectively minimized (including being suppressed). In a non-limiting example, the signal controlling component 652 can be used to detect the transmission of EM telemetry signals for the downhole EM telemetry system 654, generate a transmission sequence based on the detected transmission, and to control the transmission of EM telemetry signals by the downhole EM telemetry system 656 in a manner that any interference between the EM telemetry signals from and/or to the two or more downhole BHAs or tools of the two systems 654, 565 is effectively minimized (including being suppressed), thereby coordinating the transmissions of the two EM telemetry systems 654 and 656. In another non-limiting example, the signal controlling component 602 can be configured to receive the transmission of EM telemetry signals by the downhole EM telemetry system 654, generate a transmission sequence based on the detected transmission, and to control the transmission of EM telemetry signals by the downhole EM telemetry system 656 in a manner that any interference between the EM telemetry signals from and/or to the two or more downhole BHAs or tools of the two systems 654, 565 is effectively minimized (including being suppressed), thereby coordinating the transmissions of the two EM telemetry systems 654 and 656.

The example system 650 can include a signal controlling component 652 that is configured to analyze the transmission of EM telemetry signals by a respective downhole EM telemetry system (e.g., part of a first BHA or downhole tool) to determine data indicative of transmitting parameters of the transmission. The transmitting parameter can be, but is not limited to, one or more of a timing, a frequency, an amplitude, a phase, a pulse shape or spectral shape, a code-modulation sequence, a space-time or space-frequency, a time-frequency, a modulation type, an error correcting code, or a data rate, of the transmission of the data from the first downhole tool. A processing unit of the signal controlling component 602 can be programmed to compute a data transmission sequence using the transmitting parameters. The transmission sequence would specify the sequence of transmissions of EM telemetry signals by another downhole EM telemetry system (e.g., part of a second BHA or downhole tool), to effectively minimize (including suppress) the interference between the transmissions from the downhole EM telemetry systems (e.g., for the first and second downhole tools). The signal controlling component 652 can be configured to transmit instructions that cause the other downhole EM telemetry system (e.g., part of a second BHA or downhole tool) to transmit the data according to the data transmission sequence. The other downhole EM telemetry system (e.g., part of a second BHA or downhole tool) can include receiving units to receive the instructions for the data transmission sequence.

FIGS. 7A to 7E show different non-limiting example configurations for synchronizing the transmissions to or from multiple downhole EM telemetry systems that include downhole BHAs or tools. Each example configuration includes two downhole BHAs or tools 702-a and 702-b in telemetry communication with two surface systems 704-a and 704-b, respectively. FIGS. 7A to 7E show examples of the many ways the signal controlling component can be used to coordinate, and the different levels of coordinating, the transmissions of the EM telemetry signals communicated by the downhole EM telemetry systems, based on the example implementations described in connection with FIGS. 6A and 6B. The coordination between the uplink and downlink EM telemetry signals (or channels) on a particular well is between the downhole BHA or tool (702-a or 702-b) and its respective surface system (704-a or 704-b).

In any example herein, including the examples of any of FIGS. 1A through 7E, the surface system may not be co-located with its respective downhole tool. For example, the surface system may be positioned at a distance away from its respective downhole tool.

In any example herein, including the examples of any of FIGS. 1A through 7E, the signal coordinating component may not be co-located with the surface system or the downhole tool. For example, the signal coordinating component may be positioned at a distance away from its respective downhole tool, including at a data center.

Figure 7A:
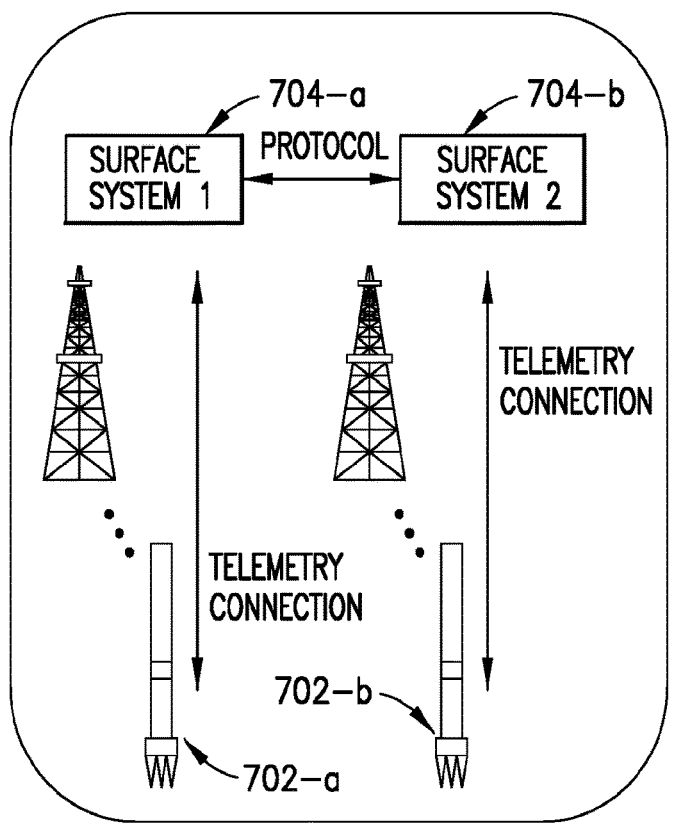
FIGS. 7A to 7E show different example configurations for synchronizing the transmissions to or from multiple downhole EM telemetry systems, according to principles of the present disclosure.

FIG. 7A shows an example implementation where the two surface systems 704-a and 704-b coordinate with each other using a protocol applied using the signal controlling component, to share information on timing, frequencies, modulation methods and data rates. As a result of the transmission sequence specified by the protocol, the transmissions for one downhole EM telemetry system, for uplink and/or downlink EM signals, do not interfere with the transmissions for the other downhole EM telemetry system. The example of FIG. 7A can be implemented as described herein in connection with FIG. 6A.

Figure 7B:
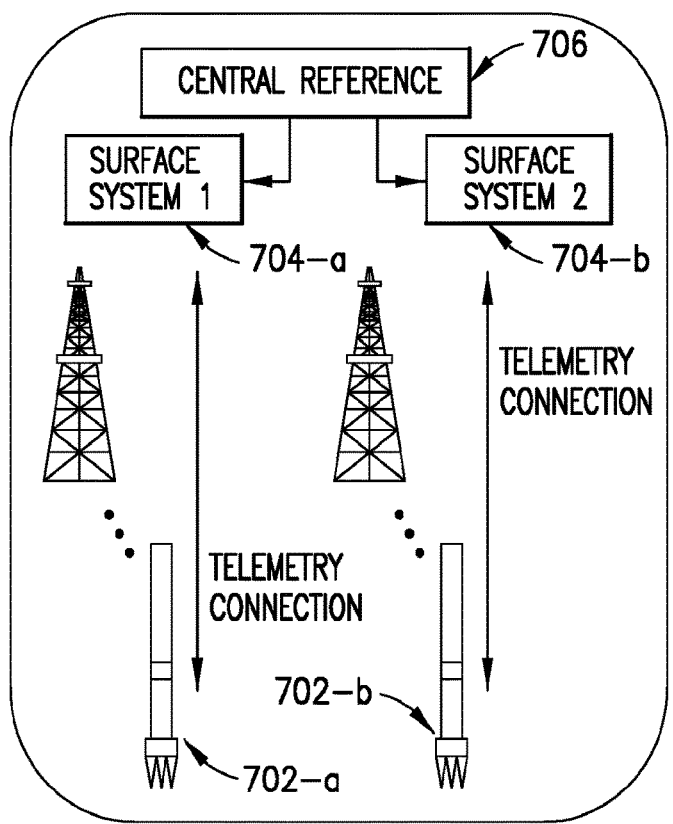

FIG. 7B shows an example implementation where the two surface systems 704-a and 704-b coordinate with a signal controlling component configured as a central reference 706. The signal controlling component is configured to coordinate the downhole EM telemetry systems of both drilling rigs. Such a signal controlling component functioning as a central reference could include a common time reference, from which frequencies can be derived. The signal controlling component assigns modulation parameters such as carrier frequencies, data rates and modulation types to ensure that the transmission signals to or from the downhole tools of the nearby drilling rigs do not interfere with each other. The example of FIG. 7B can be implemented as described herein in connection with FIG. 6A, with each of the data transmitting units and each of the receiving unit being coupled to a respective surface system, and each respective surface system is in telemetry communication with a respective downhole BHA or tool.

Figure 7C:
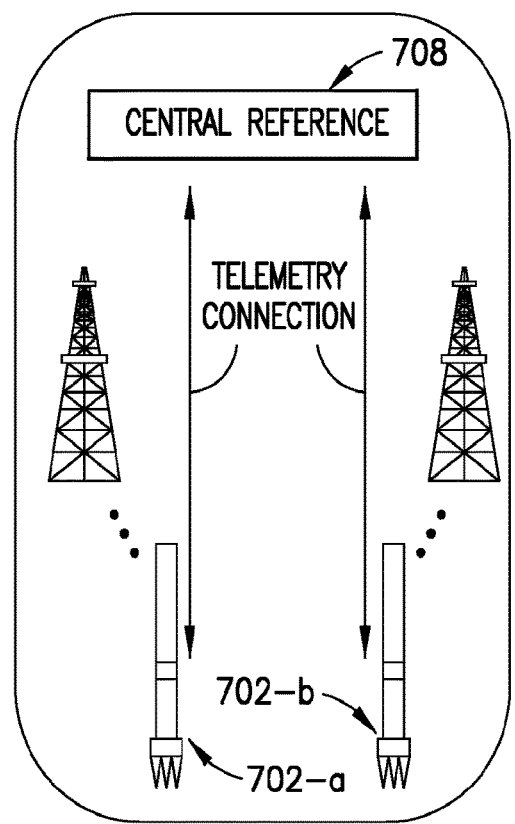

FIG. 7C shows an example implementation where the two downhole BHA or tools 702-*a* and 702-*b* coordinate with a signal controlling component part of a central system 708. The example central system 708 can serve as a centralized surface system for the two downhole BHAs or tools 702-*a* and 702-*b*. The signal controlling component is configured to control transmission of downlink EM telemetry signals to both downhole BHAs or tools as well as transmission of uplink EM telemetry signals from both downhole BHAs or tools. The central system 708 can be configured to decode the uplink EM telemetry signals from the downhole BHAs or tools. The example of FIG. 7C can be implemented as described herein in connection with FIG. 6A, adapted with a centralized surface system in telemetry communication with the two downhole BHAs or tools.

Figure 7D:
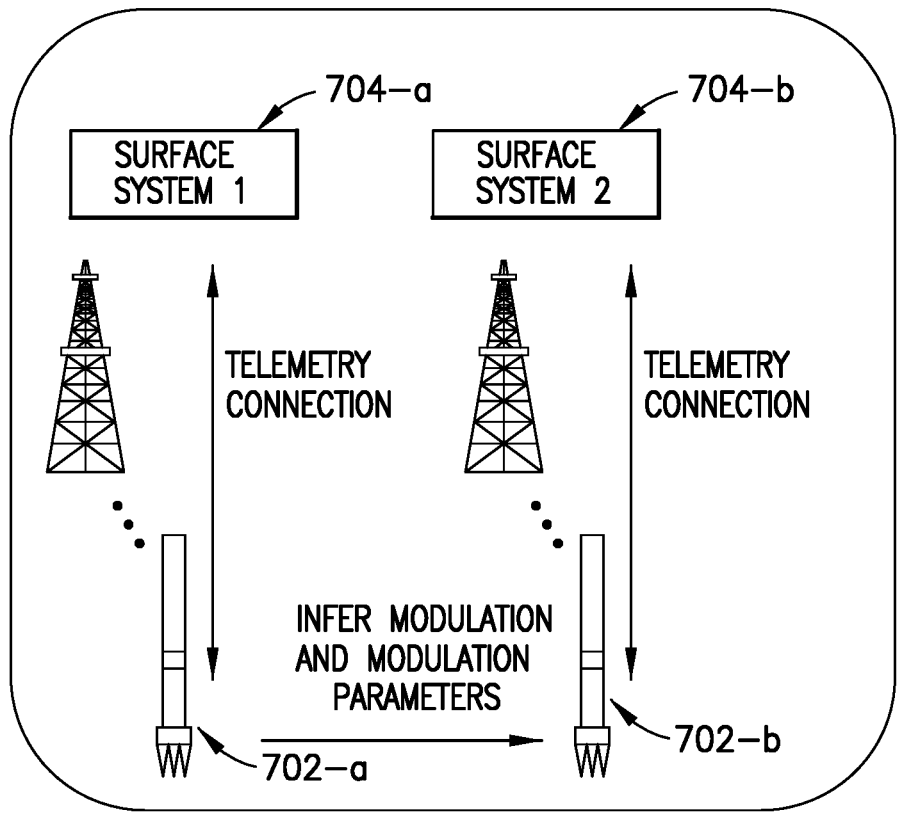
Figure 7E:
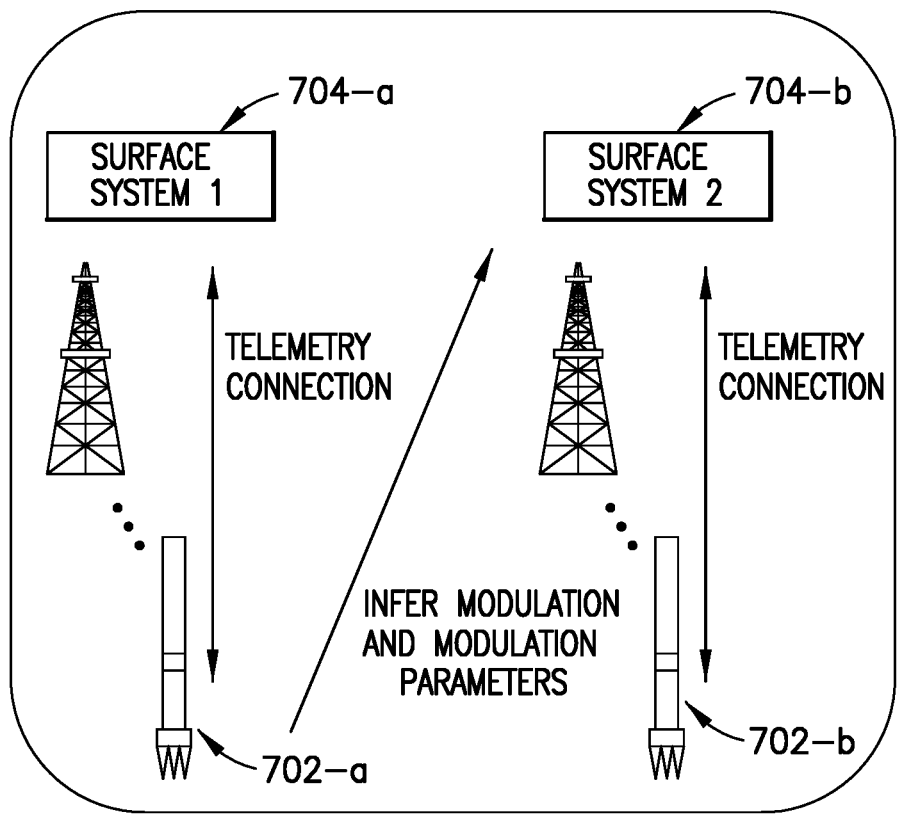

FIGS. 7D and 7E show use of the signal controlling component in an indirect means for coordinating the downhole EM telemetry systems of both drilling rigs, where the first downhole EM telemetry system does not need to be configured for communicating with the second downhole EM telemetry system. Rather, the signal controlling component can be configured to analyze the EM telemetry signals of the first downhole EM telemetry system and determine transmission parameters used by the EM telemetry signals of the first downhole EM telemetry system. The signal controlling component can be coupled to the second downhole EM telemetry system, and further configured to determine one or more unique transmitting parameters for the EM telemetry signals communicated by the second downhole EM telemetry system according to the transmission of the first downhole EM telemetry system, to minimize interference and optimize the communication and decoding of the transmissions of the second downhole EM telemetry system. The decoding of the transmission signals can be performed at one or both of the surface systems.

FIGS. 7D and 7E show example implementations where the signal controlling component is configured to analyze the transmissions of uplink EM telemetry signals from the downhole BHA or tool 702-*a*, to determine the transmission parameters for these transmissions, such as but not limited to the signal modulation or other modulation parameters. The signal controlling component is used to generate a transmission sequence for the downhole BHA or tool 702-b based on the transmission parameters for the transmissions of downhole BHA or tool 702-*a*. As a result of the transmission sequence, the transmissions for the downhole BHA or tool 702-*b*, for uplink and/or downlink EM telemetry signals, do not interfere with the transmissions for the other downhole BHA or tool 702-*a*. The example of FIGS. 7D-7E can be implemented as described herein in connection with FIG. 6B.

In the example of FIG. 7D, the signal controlling component may be configured to receive and analyze the uplink EM telemetry signals transmitted from the downhole BHA or tool 702-*a*, using a receiving unit that is co-located with, or remotely coupled to, the downhole BHA or tool 702-*b*.

In the example of FIG. 7E, the signal controlling component may be configured to receive and analyze the uplink EM telemetry signals transmitted from downhole BHA or tool 702-*a,* using a receiving unit that is co-located with, or remotely coupled to, the surface system 704-*b*.

In certain environments, such as but not limited to in an EM telemetry environment, a receiver of the uplink EM telemetry signals transmitted by the downhole BHA or tool 702-*b* may be subjected to much less noise and/or attenuation, and may be able to reliably decode the transmission from the downhole BHA or tool 702-*b*.

An example herein, including the examples of any of FIGS. 1A through 7E, can be applied to systems with multiple downhole BHAs or tools (i.e., two or more). Any subsets of the multiple downhole BHAs or tools and their associated surface systems can use one or several of the coordination schemes as described in connection in connection with any of FIGS. 1A through 7E.

In an example, the signal controlling component can be configured such that all surface systems coordinate their respective downhole BHAs or tools, or that there is a central surface system that controls all downlink and thus their uplink transmission parameters. In another example, the signal controlling component can be configured such that only a subset of the systems is coordinated. The surface systems in the subset are aware of other interfering downhole BHAs or tools, while the other surface systems may not able to coordinate with the cooperating subset of surface system and downhole BHAs or tools using the signal controlling component.

Example systems, methods, and apparatus described herein can be used for controlling an uplink or downlink of data. The example system can include a signal controlling component that is configured for signal coordination control that allows multiple devices to transmit at the same time with little to no interference. The example system can be configured to receive data using two or more downhole tools. The data can include i) data indicative of at least one geological formation parameter, or (ii) data indicative of at least one operation parameter, or (iii) a combination of both (i) and (ii). The signal controlling component can be an apparatus as described in FIG. 5, including a memory and a processing unit. The processing unit of the signal controlling component can be programmed to perform signal coordination control of the transmissions of EM telemetry signals from and/or to two or more downhole BHAs or tools such that interference between the EM telemetry signals from and/or to the two or more downhole tools is minimized. The signal controlling component can be used to control duplex bi-directional communication involving both uplink and downlink EM telemetry signals. The downhole tools can include EM communication units that support the transmission of uplink EM telemetry signals and the reception of downlink EM telemetry signals as dictated by the signal coordination control.

In an example, the signal controlling component can be programmed to apply the signal coordination control to an EM relay system, such that strict restrictions on time division or frequency division can be overcome. In a relay system including a number (N) of relays, there are N+2 total transmitters. This includes the transmitter at each of the N relay stations, the transmitter of the surface system, and the transmitter of the downhole tool (such as but not limited to a MWD tool). The signal controlling component can be configured to apply the signal coordination control to allow multiple devices to transmit at the same time with little to no interference.

In an example, the signal controlling component can be programmed to provide full duplex bi-directional communication that minimizes or suppresses interference between transmission signals. As the EM propagation is nearly instantaneous, there is nearly no time offset difference between uplink and downlink signals as they are transmitted and received at the receiver of the downhole tool and at the surface systems, respectively. As an example, Orthogonal Frequency Division can be used such that uplink and downlink signals can be received and decoded simultaneously. As another example, by synchronizing the timing of two single carrier communications, the interference between the two transmission signals can be minimized. The downlink signal can be time-synchronized to the uplink signal and orthogonal signaling methodologies can be used.

Following are example signal coordination controls that can be applied using any example signal controlling component described herein.

In a first example, the signal coordination control can apply a methodology to simultaneously and independently decode signal transmissions of data, with minimal or no coordination between the transmitter. The methodology can include converting both signals to respective baseband equivalents, given the respective choices of modulation, symbol rate, pulse shape, carrier frequency. Decoding parameters such as but not limited to timing offset, frequency offset, phase offset, and gain are determined. The two demodulators corresponding to the two separate downhole systems can be run in parallel to demodulate the signals to derive the data. Pulse shaping can be used to control the spectrum of the two transmitted signals in such a way as to minimize interference between the two transmission signals. FIGS. 8A and 8B show the pulse shaped spectrum of two transmission signals, with signal processing of QPSK with 20 dB signal strength difference between them. The symbol rate is 1 symbols/sec for both signals, centered at 2 Hz and 4 Hz respectively. With a square-root raised cosine pulse shaping applied at the transmitter, the out-of-band energy from each of the two signals can be maintained such that it is possible to separately decode both signals reliably. This example implementation applies frequency division duplexing or frequency division multiple access (FDMA).

In a second example, the signal coordination control can apply a methodology to successively decode signal transmissions of data with little transmitter coordination. The methodology can include determining which of the transmission signals of data is the strongest among all the downhole tools, and decoding the transmission signal from that downhole tool with the strongest transmission. The effective propagation channel is determined. An estimate of the received signal from strongest downhole tool is obtained from the estimate of the effective propagation channel and the reconstructed transmitted signal from the decoded transmission. The estimate of the received signal is subtracted from the received signal. The transmission signal from the downhole tool that transmits the second highest transmission is decoded based on the subtracted received signal.

In an example system where multiple electrodes are used, this example methodology gives the capability of decoding the transmission signal from any of the downhole tools based on a subset of the electrodes, and applying the propagation estimate and subtraction to transmission signals from another possibly different subset of the electrodes.

For example, given stake sensors A and B in an area with downhole tools, the transmission signal from one of the downhole tools can be decoded from measurements of stake sensor A and B simultaneously. The effective channels to sensors A and B can be estimated separately. For each of sensors A and B, the transmission signal from the downhole tool is subtracted from the measurements of sensor A and sensor B separately. As another example, the transmission signal from a first downhole tool can be decoded exclusively from sensor A, the subtraction from sensor B can be applied, and the transmission signal from the second downhole tool can be decoded from sensor B after the subtraction is performed.

In a third example, the signal coordination control can apply a methodology to coordinate the time division of the transmission signals. In an example where it is possible to have some level of coordination between the two surface systems, time slots can be allocated for the two downhole tools, both for uplink and downlink. In this example, a time reference is defined. For example, the time reference can be either one of the surface systems or another centralized clock that is distributed to all the surface systems. All downlinks from all surface systems are at least coordinated by the time reference. The signal coordination control can cause the downhole tools to adjust the timing of the signal transmissions of the data based on the received downlink signals. The downlink signal(s) can be either common instructions that can be decoded by all downhole tools or separate instructions sent separately from each surface system, but within each assigned time slot for each downhole tool. Each downhole tool can be caused to transmit only within its assigned uplink time slots.

Figure 9A:
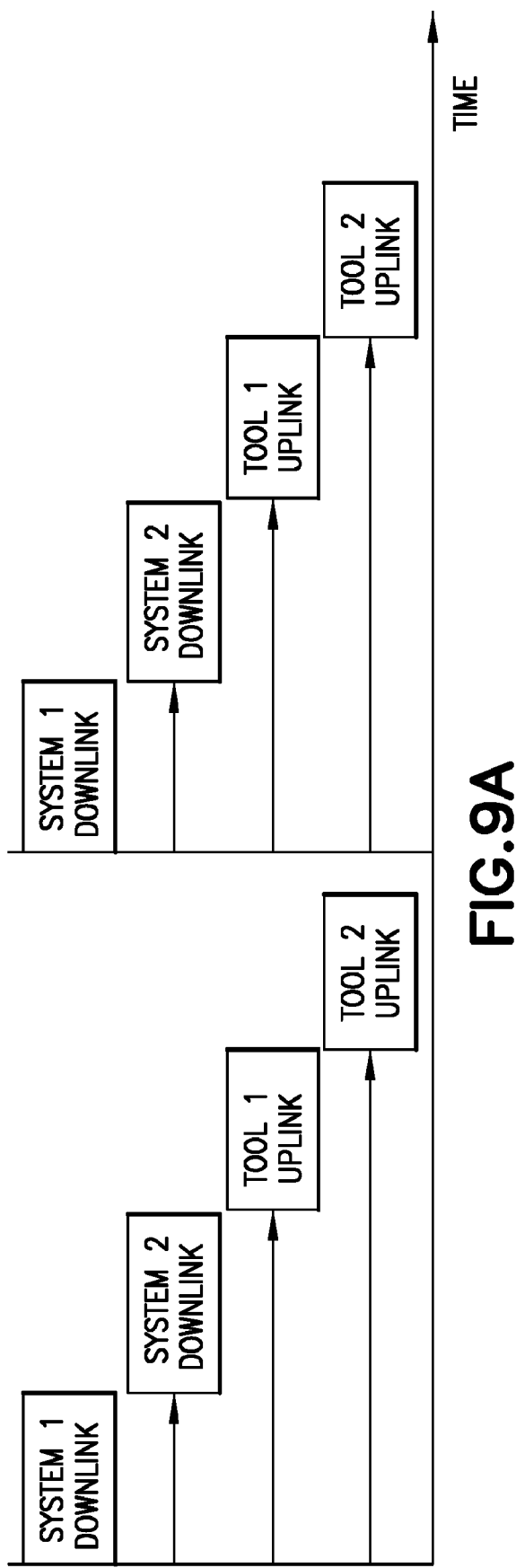
FIGS. 9A and 9B show example transmission sequences for time-division coordinated uplink and downlink transmissions of two downhole EM telemetry systems, according to principles of the present disclosure.
Figure 9B:
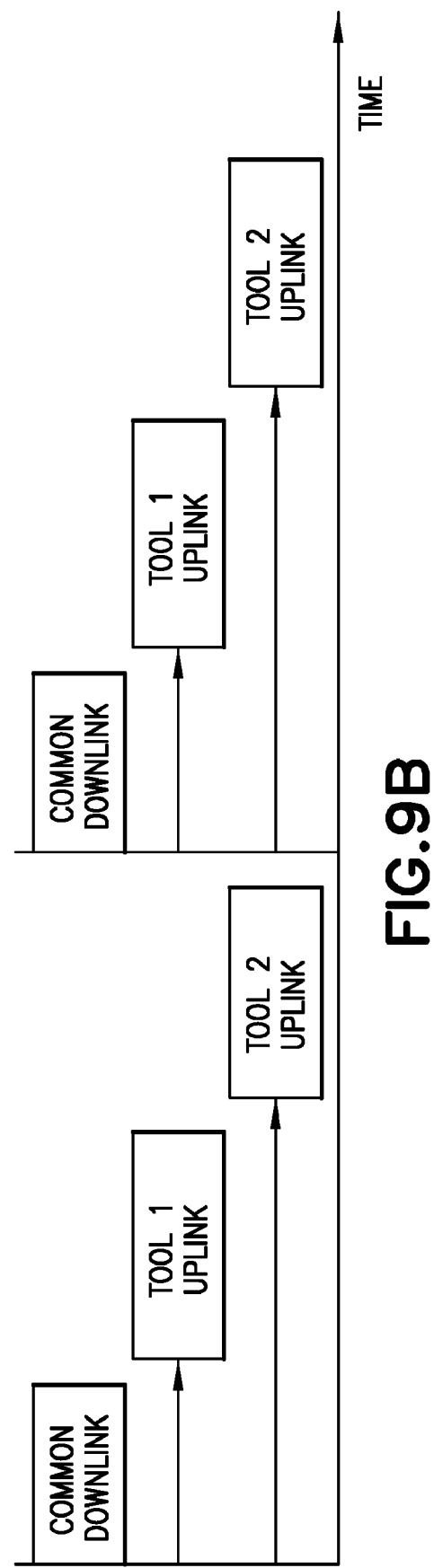

FIGS. 9A and 9B show non-limiting example transmission sequences for time-division coordinated uplink and downlink of two systems (System 1 and System 2, each system being comprised of a downhole tool with a respective surface system. In the example of FIG. 9A, the downlink of System 1 is used as a time reference. The transmissions of System 2, uplink 1, uplink 2 are all based on agreed-upon time delays relative to the downlink of System 1. In the example of FIG. 9B, there is a common downlink for both Systems 1 and 2, such that their downlink is coordinated ahead of time. The transmissions of uplink 1 and uplink 2 are all based on agreed-upon time delays relative to the common downlink. The choice of uplink time slots and uplink points for each Tool can be encoded within the downlink. In another example, the uplink signals can be scheduled relative to each other. Where relatively synchronized clocks are used, the amount of drift can be limited from one frame to the next, and there can be little need for updating the clocks of the downhole tool based on the downlinks. This example implementation applies time division duplexing or time division multiple access (TDMA).

In a fourth example, the signal coordination control can apply a methodology to coordinate the transmission time with single carrier modulations. In an example where it is possible to have some level of coordination between the two surface systems, time slots can be allocated for the two downhole tools, both for uplink and downlink. In this example, a time reference is defined. For example, the time reference can be either one of the surface systems or another centralized clock that is distributed to all the surface systems. All Downlinks from all surface systems are at least coordinated by the time reference. The signal coordination control can cause the downhole tools to adjust their timing based on the received downlink signals. The downlink signal(s) can be either common instructions that can be decoded by all downhole tools or separate instructions sent separately from each surface system, but within each assigned time slot. The downhole tools can be caused to transmit simultaneously such that their symbol transmission times are synchronized. The baseband transmission signals for each of the transmissions from the downhole tools are obtained at the receiver.

In an example where the symbol rates are the same (or integer multiples of a common symbol rate), carrier frequencies are separated by integer multiples of the symbol rates, and pulse shapes are chosen correctly, then it is possible to obtain orthogonality between two single carrier modulations.

Figure 10:
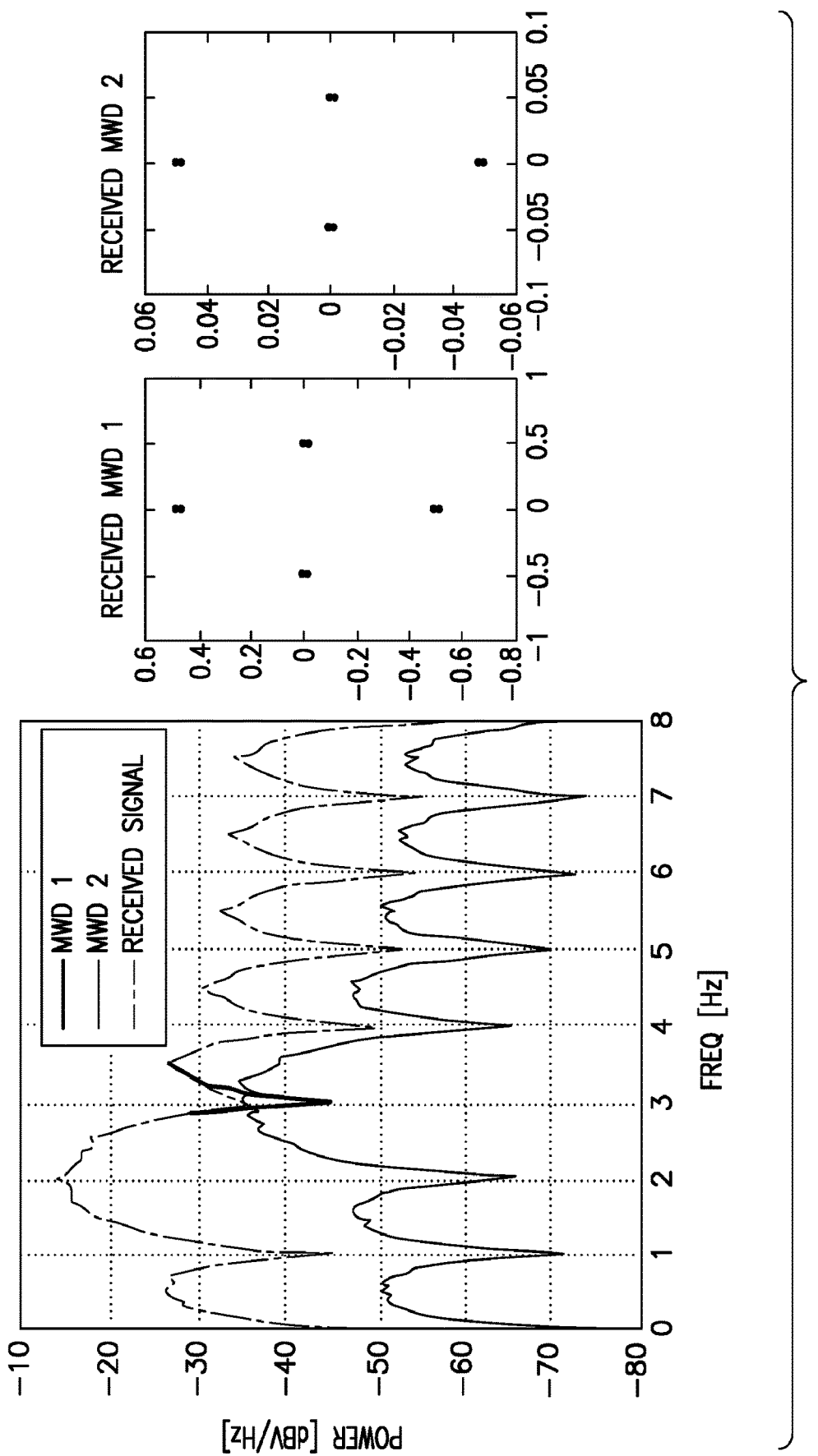
FIG. 10 shows an example of coordinating two simultaneous single-carrier modulations, according to principles of the present disclosure.

FIG. 10 shows a non-limiting example of coordinating two simultaneous single-carrier modulations, where there are two transmissions of QPSK modulation, both at 1 symbols/sec, at carrier frequencies 2 Hz and 3 Hz, with square pulse shape. The spectrum in FIG. 10 shows significant spectral overlap, and one signal is 20 dB smaller than the other. When the transmission times are synchronized, the two symbol sequences can be reliably decoded at the receiver without interference.

In a fifth example, the signal coordination control can apply a methodology to coordinate orthogonal frequency division multiplexing of the transmission signals. In an example where it is possible to have simultaneous uplink transmission from multiple EM downhole tools, it is possible to enhance the second example of the signal coordination control by using Orthogonal Frequency Division Multiplexing (OFDM). OFDM is also used for 4G wireless communication and for Wi-Fi (IEEE 802.11 standards). The OFDM uses multiple sub-bands simultaneously, such that different bits or modulation symbols can be assigned to each sub-band independently. An efficient way to do this computation is to use the inverse Fast Fourier Transform (aft), or generally an inverse Discrete Fourier Transform (iDFT). The receiver is either an FFT or a DFT. When the channel is not flat, then there may be interference from one OFDM symbol (or equivalently one iFFT block) to the next one(s). A cyclic prefix can be used to provide a time guard band between transmitted OFDM symbols. To enable simultaneous uplink, different subcarriers can be assigned to each downhole tool.

Figure 11:
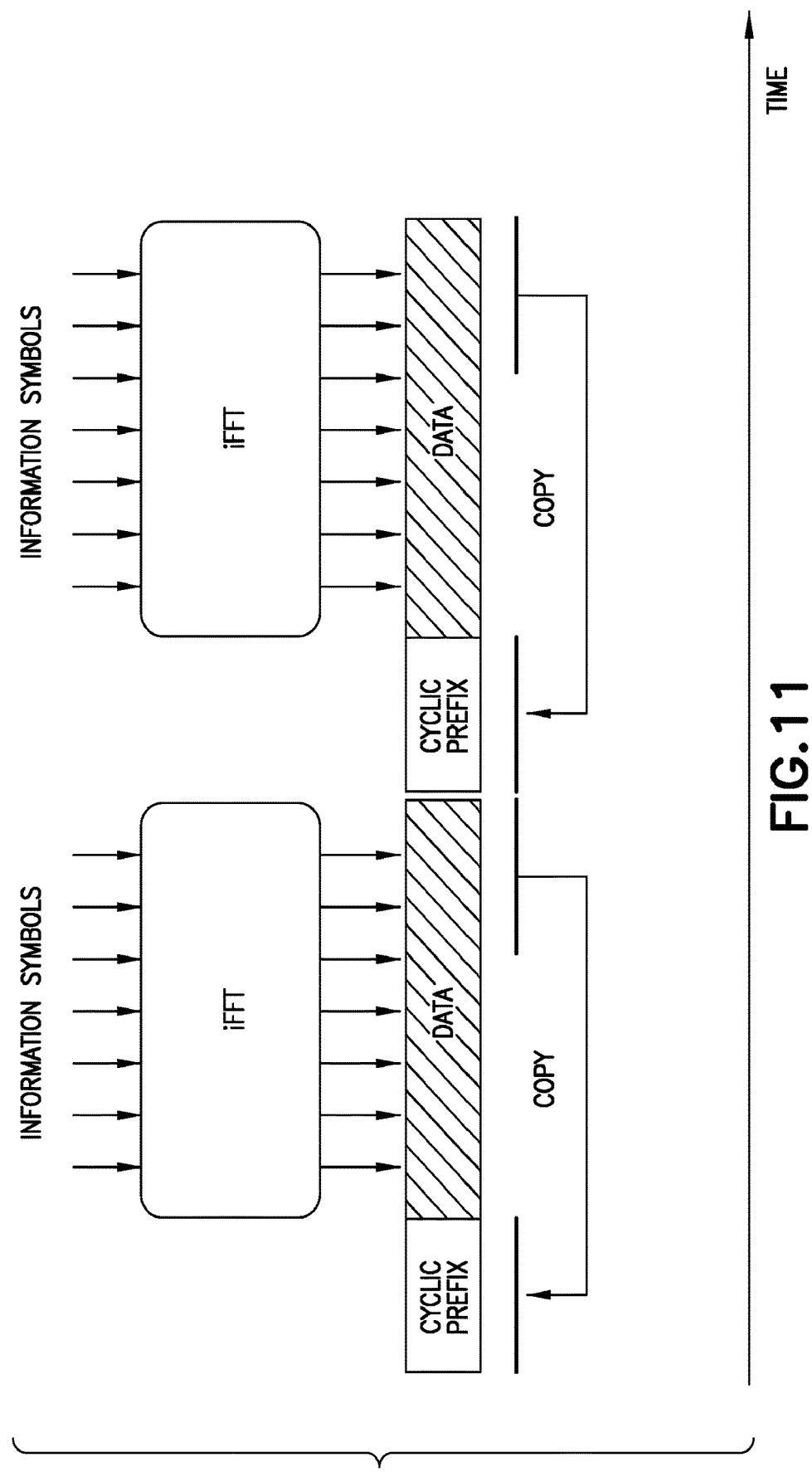
FIG. 11 shows an example of orthogonal frequency division multiplexing (OFDM) transmitter operation, according to principles of the present disclosure.

FIG. 11 shows an example of an OFDM transmitter operation.

Figure 12:
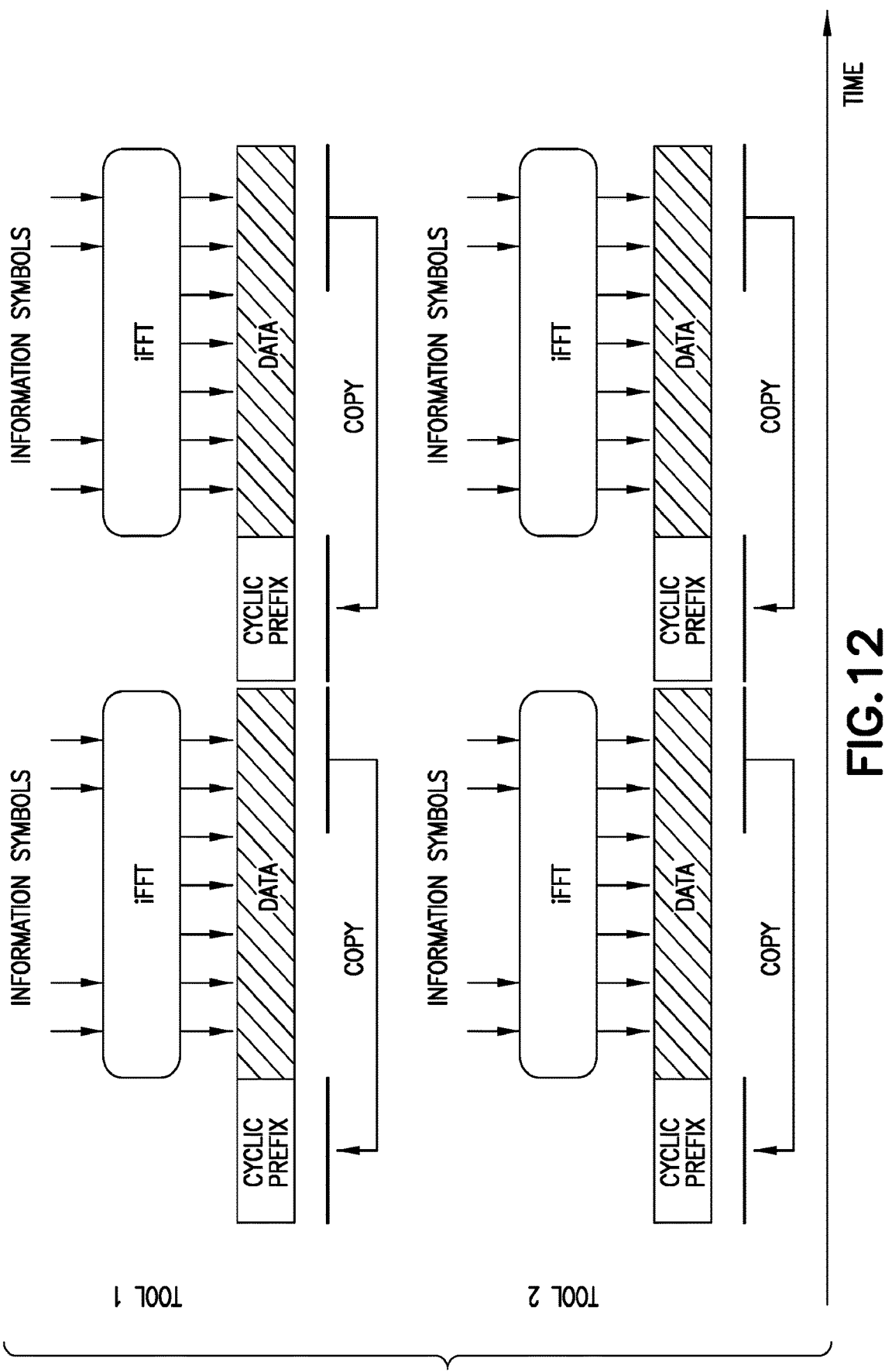
FIG. 12 shows an example of two OFDM transmitters using two different subsets of channels, according to principles of the present disclosure.

FIG. 12 shows an example of two OFDM transmitters using two different subsets of channels, involving two downhole systems that both are to transmit at 2 bps using QPSK modulation. The first tool uses 1 Hz and the second tool uses 2 Hz. In this example, the first MWD is subjected to 10 dB of attenuation and the second MWD is subjected to 20 dB of attenuation. The two transmitters use pulse shaping to further reduce the out-of-band transmissions in their respective signals.

Figure 13:
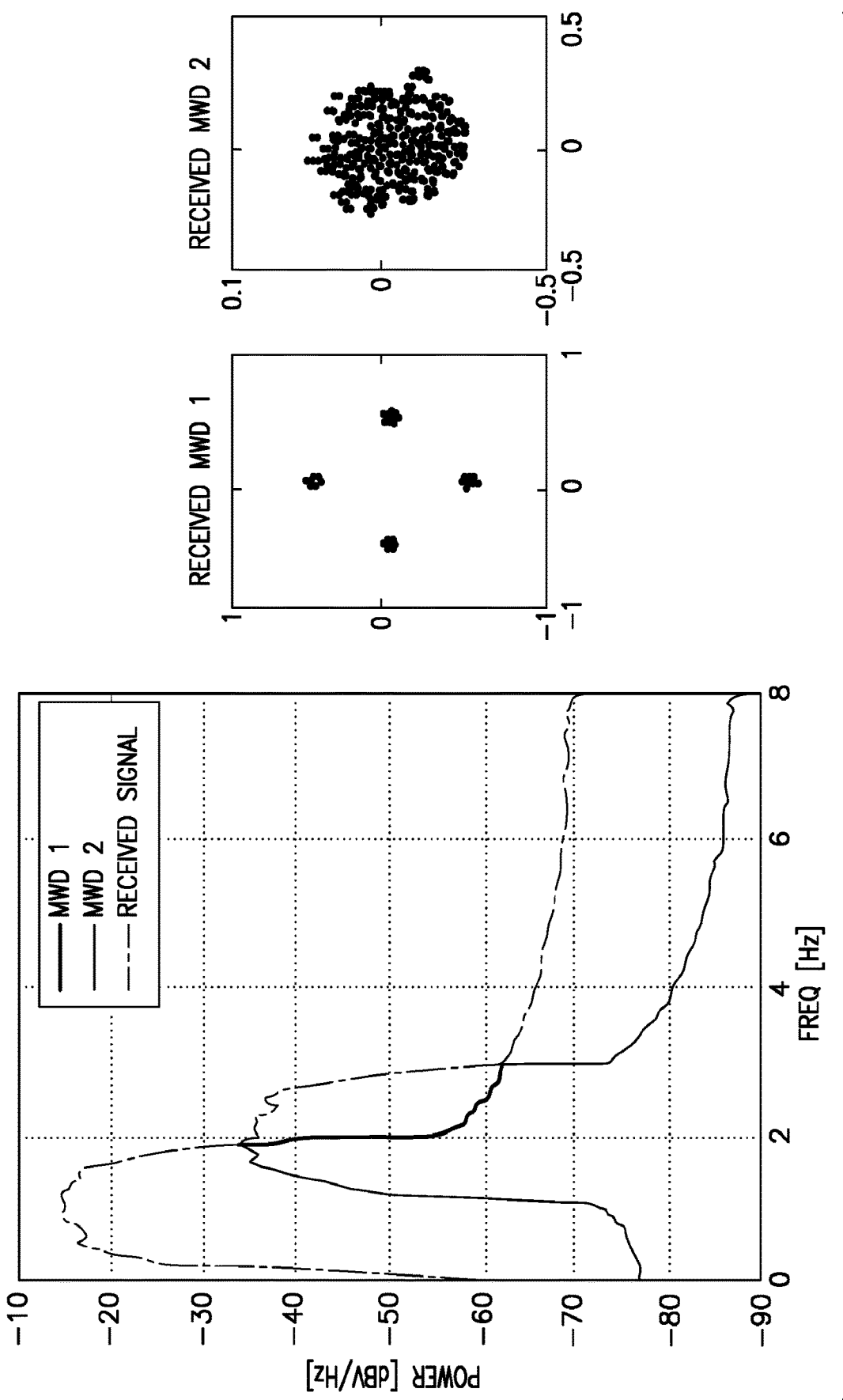
FIG. 13 shows example results for simultaneous signals transmission and separate decoding, according to principles of the present disclosure.

FIG. 13 shows the results obtained when the signals are transmitted simultaneously through the same channel and decoded separately without further coordination. Specifically, FIG. 13 shows a plot for two transmitters at 1 Hz and 2 Hz, both at 2 bps, and the resulting decoded signals.

Figure 14:
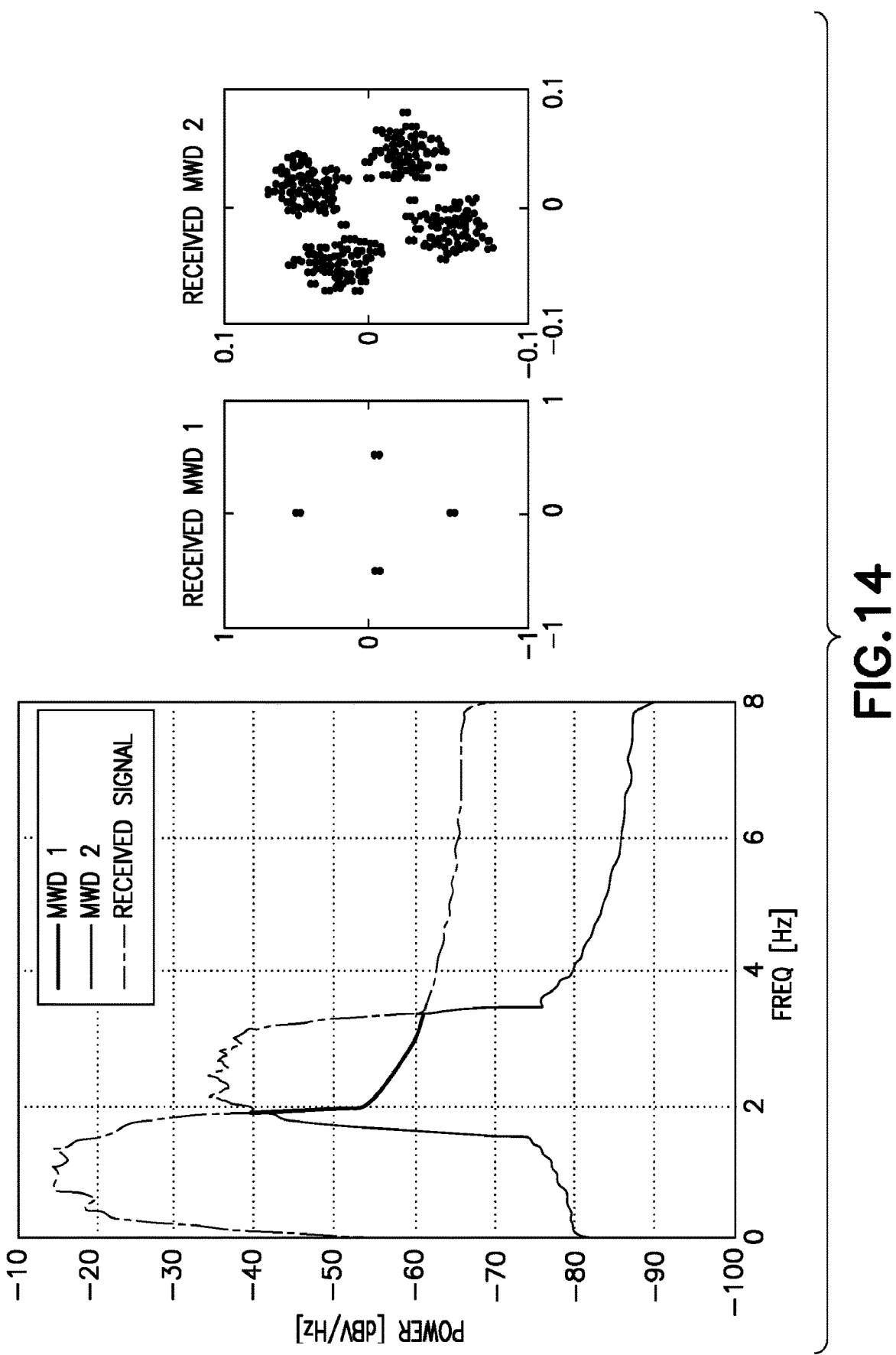
FIG. 14 shows example results for increased frequency separation, according to principles of the present disclosure.

FIG. 14 shows the results obtained when the frequency separation is increased such that the transmitters use 1 Hz and 2.5 Hz, respectively, both at 2 bps, and the resulting decoded signals.

The decoding quality of the transmission from the second downhole tool is improved, with use of more total bandwidth the second downhole tool transmitting in a higher frequency band.

Figure 15:
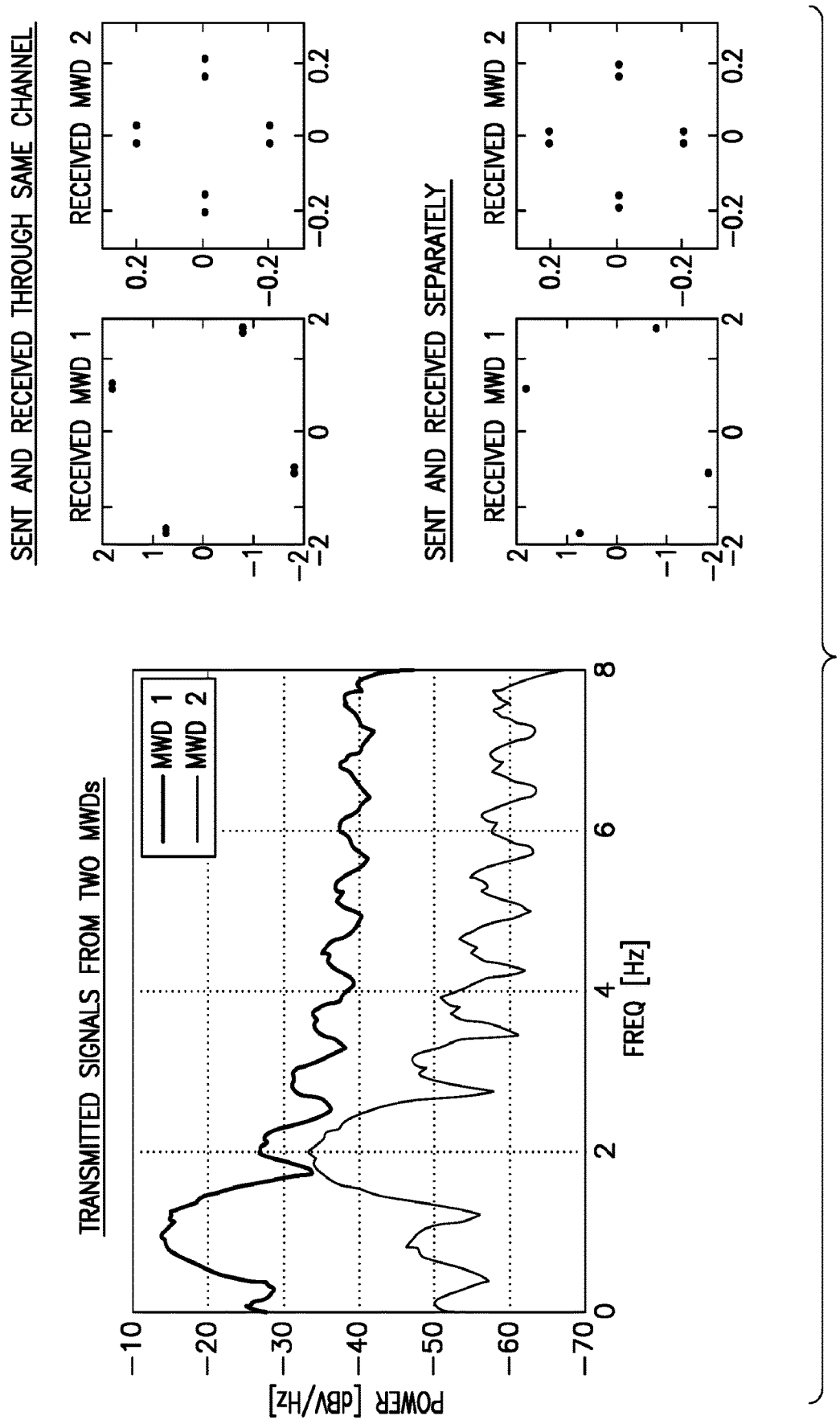
FIG. 15 shows the results obtained when OFDM is used from two separate downhole tools, according to principles of the present disclosure.

FIG. 15 shows the results obtained when OFDM is used from two separate downhole tools similar to the system of FIG. 2, resulting in orthogonality. FIG. 15 shows an example for two transmitters at 1 Hz and 2 Hz, both at 2 bps, and the resulting decoded signals.

For a modest overhead in OFDM formatting, namely the use of cyclic prefix, higher signal quality can be obtained. The time guard band introduced by using a cyclic prefix can also provide robustness against time offsets between the two transmitters. In the example shown in FIG. 15, a large timing offset (40% of the cyclic prefix length) is used between the two transmitters. When the decoding is done in reference to Tool 1, then a small distortion is introduced in the decoding of Tool 2. The results demonstrate robustness to small timing mismatches between the two transmitters of the two downhole tools. The bottom right panels of FIG. 15 show the decoding results when the two signals are transmitted and decoded separately. If OFDM is used with a common downlink transmitter, then signals can be sent simultaneously to both downhole tools and no cyclic prefix is needed to address timing offsets.

The OFDM can be further enhanced with use of, e.g., pulse shaping, windowing, or windowed acquisition. Non-limiting examples of such enhanced OFDM are filtered OFDM and discrete wavelet transform OFDM.

In a sixth example, the signal coordination control can apply a methodology for modulations that minimize interference between signals. With OFDM modulation, signals are transmitted using orthogonal frequency bands that can partially overlap each other and yet can be separated at the receiving end of the link. In other examples, transmission schemes can be implemented that use other orthogonal transmission schemes. One such method is code division multiple access (CDMA), in which orthogonal sequences, e.g. Walsh-Hadamard codes, can be assigned to different transmitters. Multiple signals can simultaneously be transmitted over the same frequency band by assigning each user, at the transmitter end of the link, its own code sequence. At the receiving end, the signal from a particular user at the transmitter end of the link can be extracted by cross-correlating the received composite signal with the code sequence for the desired user. Other non-limiting example transmission schemes using orthogonal basis functions also can be used, other than sinusoids (OFDM), wavelets or CDMA sequences.

Figure 16A:
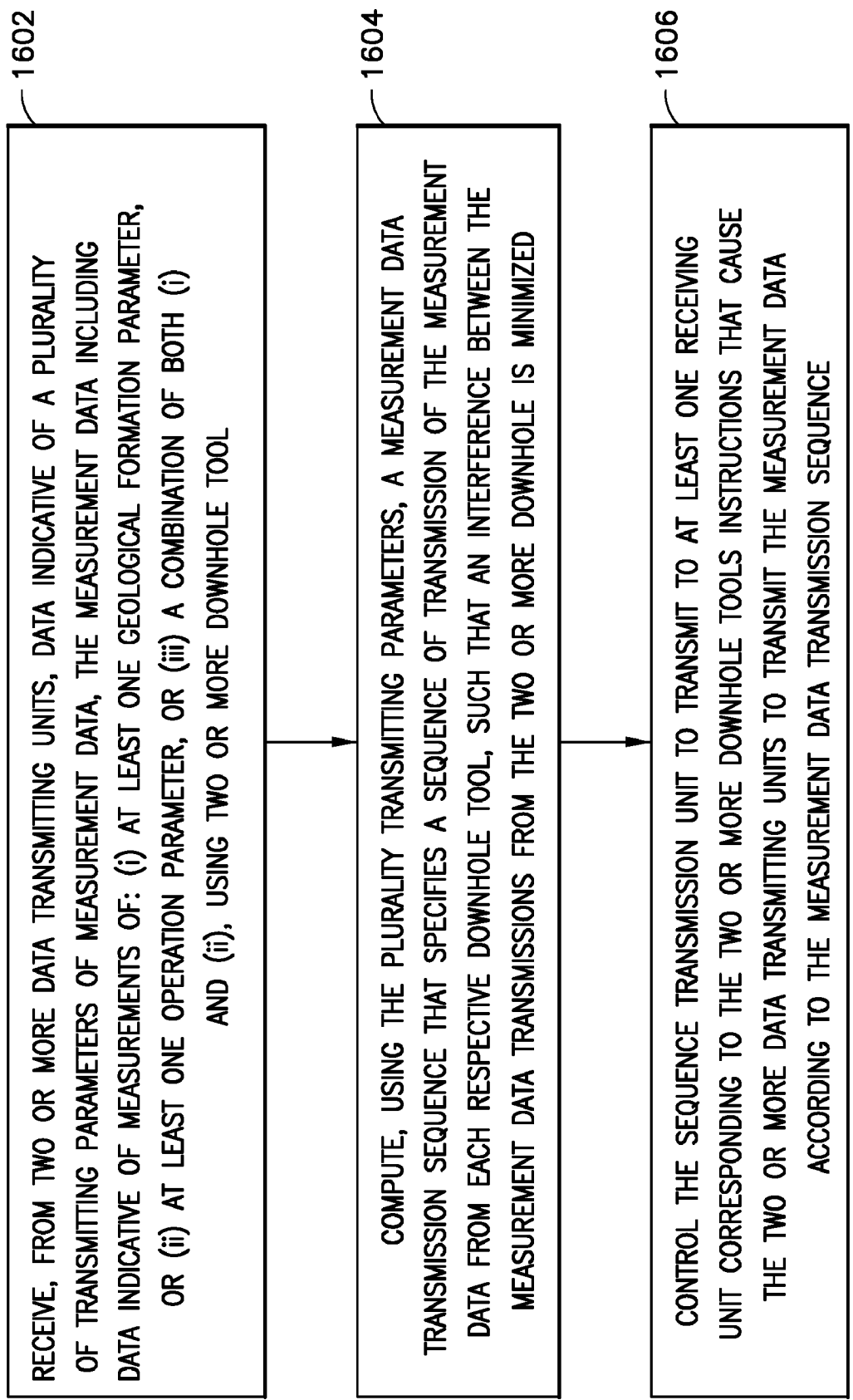
FIGS. 16A and 16B show flow diagrams of example methods, according to principles of the present disclosure.
Figure 16B:
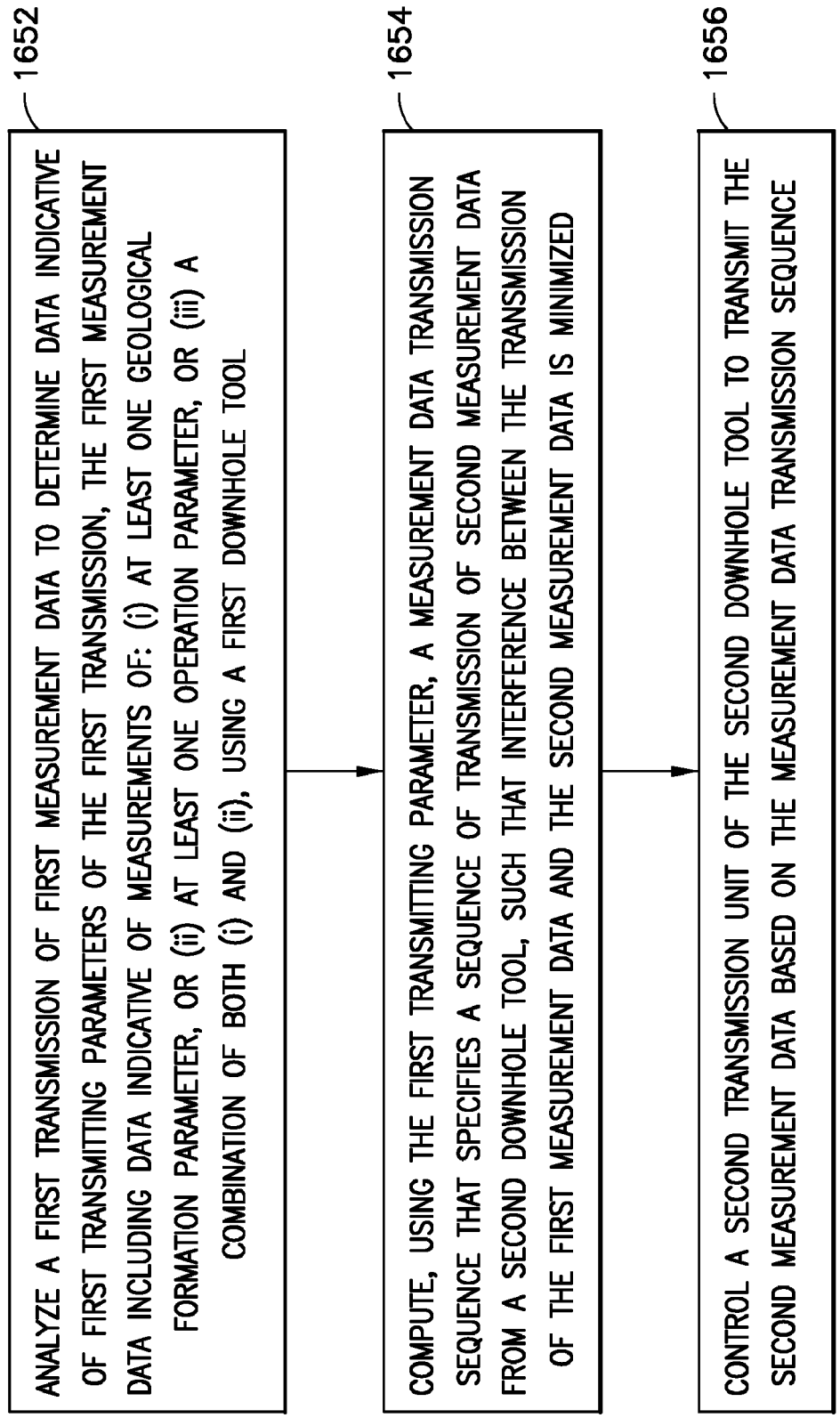

FIGS. 16A-16B show example methods that can be implemented using an example system including a signal control component, according to the principles herein. One or more of the steps of FIGS. 16A-16B can be implemented using a controller based on a command or other signal from a processing unit executing instructions stored to a memory.

FIG. 16A shows an example method that includes (step 1602) receiving, from two or more data transmitting units, data indicative of a plurality of transmitting parameters of data, the data including data indicative of measurements of: (i) at least one geological formation parameter, or (ii) at least one operation parameter, or (iii) a combination of both (i) and (ii), using two or more downhole tools (step 1604) computing, using the plurality of transmitting parameters, a data transmission sequence that specifies a sequence of transmission of the data from each respective downhole tool, such that an interference between the data transmissions from and/or to the two or more downhole tools is minimized, and (step 1606) controlling the sequence transmission unit to transmit to at least one receiving unit corresponding to the two or more downhole tools instructions that cause the two or more data transmitting units to transmit the data according to the data transmission sequence.

FIG. 16B shows another example method that can be implemented using an example system including a signal control component, according to the principles herein. In step 1652, a first transmission of first data is analyzed to determine data indicative of first transmitting parameters of the first transmission, the first data including data indicative of measurements of: (i) at least one geological formation parameter, or (ii) at least one operation parameter, or (iii) a combination of both (i) and (ii). In step 1654, a data transmission sequence that specifies a sequence of transmission of second data from a second downhole tool is computed using the first transmitting parameter, such that interference between the transmission of the first data and the second data is minimized. In step 1656, a second transmission unit of the second downhole tool is controlled to transmit the second data based on the data transmission sequence.

Figure 17:
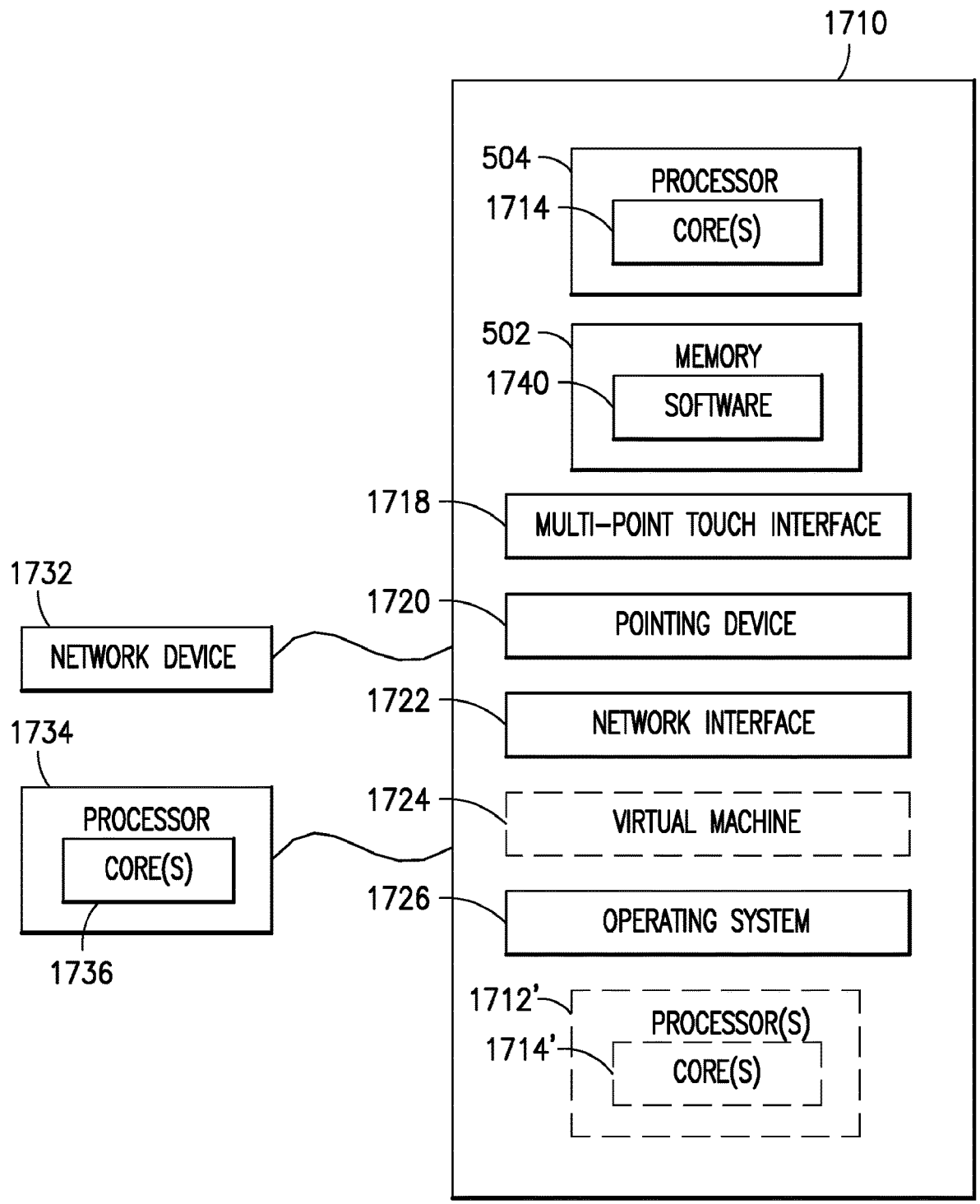
FIGS. 17 is an example computational device block diagram, according to principles of the present disclosure.

FIG. 17 is a block diagram of an example computing device 1710 that can be used as a signal controlling component according to the principles herein. In any example herein, computing device 1710 can be configured as a console that receives user input to implement the signal controlling component, including to apply the signal coordination control. For clarity, FIG. 17 also refers back to and provides greater detail regarding various elements of the example system of FIG. 5. The computing device 1710 can include one or more non-transitory computer-readable media for storing one or more computer-executable instructions or software for implementing examples. The non-transitory computer-readable media can include, but are not limited to, one or more types of hardware memory, non-transitory tangible media (for example, one or more magnetic storage disks, one or more optical disks, one or more flash drives), and the like. For example, memory 502 included in the computing device 1710 can store computer-readable and computer-executable instructions or software for performing the operations disclosed herein. For example, the memory 502 can store a software application 1740 which is configured to perform various of the disclosed operations (e.g., analyze a transmission of data, apply a signal coordination control to the transmissions of data, or performing a computation). The computing device 1710 also includes configurable and/or programmable processor 504 and an associated core 1714, and optionally, one or more additional configurable and/or programmable processing devices, e.g., processor(s) 1712' and associated core(s) 1714' (for example, in the case of computational devices having multiple processors/cores), for executing computer-readable and computer-executable instructions or software stored in the memory 502 and other programs for controlling system hardware. Processor 504 and processor(s) 1712' can each be a single core processor or multiple core (1714 and 1714') processor.

Virtualization can be employed in the computing device 1710 so that infrastructure and resources in the console can be shared dynamically. A virtual machine 1724 can be provided to handle a process running on multiple processors so that the process appears to be using only one computing resource rather than multiple computing resources. Multiple virtual machines can also be used with one processor.

In one example, signal controlling component may determine the best transmitting parameters based on characteristics of effective communication channels between the various transmitting tools and the sensors, and/or signal parameters between the various transmitting tools and sensors. The characteristics of the effective communication channels can be estimated or measured by sending a set of known preambles or training sequences from the transmitting tools, either simultaneously or sequentially. The signal controlling component can apply a channel model on the signals received at the sensors in response to the transmission of such training sequences in order to improve the accuracy of the measurements of the characteristics of such effective communication channels. Similarly, the signal controlling component can determine signal parameters (such as time, phase, and frequency offsets) for such signals received at the sensors.

Memory 502 can include a computational device memory or random access memory, such as DRAM, SRAM, EDO RAM, and the like. Memory 502 can include other types of memory as well, or combinations thereof A user can interact with the computing device 1710 through a visual display unit 1728, such as a computer monitor, which can display one or more user interfaces 1730 that can be provided in accordance with example systems and methods. The computing device 1710 can include other I/O devices for receiving input from a user, for example, a keyboard or any suitable multi-point touch interface 1718, a pointing device 1720 (e.g., a mouse). The keyboard 1718 and the pointing device 1720 can be coupled to the visual display unit 1728. The computing device 1710 can include other suitable conventional I/O peripherals.

The computing device 1710 can also include one or more storage devices 1734, such as a hard-drive, CD-ROM, or other computer readable media, for storing data and computer-readable instructions and/or software that perform operations disclosed herein. Example storage device 1734 can also store one or more databases for storing any suitable information required to implement example systems and methods. The databases can be updated manually or automatically at any suitable time to add, delete, and/or update one or more items in the databases.

The computing device 1710 can include a network interface 1722 configured to interface via one or more network devices 1732 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In another example, network interface 1722 can be configured to interface via one or more network devices 1732 with the cloud (such as but not limited to a server of a data center). The network interface 1722 can include a built-in network adapter, network interface card, PCMCIA network card, card bus network adapter, wireless network adapter, USB network adapter, modem or any other device suitable for interfacing the computing device 1710 to any type of network capable of communication and performing the operations described herein. Moreover, the computing device 1710 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1710 can run any operating system 1726, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the console and performing the operations described herein. In some examples, the operating system 1726 can be run in native mode or emulated mode. In an example, the operating system 1726 can be run on one or more cloud machine instances.

Conclusion

The above-described embodiments can be implemented in any of numerous ways. For example, some embodiments may be implemented using hardware, software or a combination thereof When any aspect of an embodiment is implemented at least in part in software, the software code can be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, compact disks, optical disks, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of " "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to.

Although only a few examples have been described in detail above, those skilled in the art will readily appreciate that many modifications are possible in the examples without materially departing from this subject disclosure. For example, in alternate embodiments, the downhole tools (or sensors) as described herein can be mounted to completion tubing, cable, or attached onto the formation. In these alternate embedment, downhole EM telemetry systems can be used to provide bidirectional communication between the downhole tools (or sensors) and surface-located equipment. Furthermore, the downhole tools (or sensors) as described herein can be used for drilling applications. In alternate embodiments, the downhole tools (or sensors) as described herein can be used for communication of EM telemetry signals in other oilfield settings, e.g. for cementing, fracturing, sand control, well testing, perforating, completions etc.

Accordingly, all such modifications are intended to be included within the scope of this disclosure as defined in the following claims.

What is claimed is:

1. A method of communicating between at least one surface system and a plurality of downhole tools using electromagnetic telemetry signals, the method comprising:
communicating a plurality of electromagnetic telemetry signals between at least one surface system and a plurality of downhole tools using signal coordination control that coordinates transmission of the plurality of electromagnetic telemetry signals, wherein the downhole tools are mounted to corresponding drill strings or completion tubing or cable or attached onto the formation; and the at least one surface system is connected to at least one sensor that measures the signal between a pair of electrodes (or a plurality of electrode pairs) in electrical contact with the earth at different locations, the at least one surface system is configured to detect the uplink electromagnetic telemetry signals by measuring potential difference between a pair of electrodes (or a plurality of electrode pairs) in electrical contact with the earth at locations and in a manner assuring a substantial potential difference between the two electrodes, wherein the electrodes are selected from the group including a metal (conducting) stake in the ground, a metal fence or powerline pylon, well casing, blowout preventer, rig structure, a drill string, or the wellhead or casing of another well in the vicinity of the well with the downhole tool, and wherein:
the signal coordination control determines at least one unique transmitting parameter for a corresponding electromagnetic telemetry signal communicated between the at least one surface system and a first downhole tool,
the at least one unique transmitting parameter controls transmission of the corresponding electromagnetic telemetry signal, wherein the plurality of electromagnetic telemetry signals includes uplink electromagnetic telemetry signals that are transmitted by the downhole tools and propagate through a subterranean formation; and the at least one unique transmitting parameter controls transmission of a corresponding uplink electromagnetic telemetry signal, and
the at least one unique transmitting parameter simultaneously suppresses interference between the corresponding electromagnetic telemetry signal and at least one other electromagnetic telemetry signal communicated between the at least one surface system and a second downhole tool.

2. The method of claim 1, wherein:
the at least one surface system is configured to detect the uplink electromagnetic telemetry signals by measuring electric field variations, magnetic field variations or both electric and magnetic field variations.

3. The method of claim 1, wherein:
the plurality of electromagnetic telemetry signals includes downlink electromagnetic telemetry signals that are transmitted by the least one surface system and propagate through a subterranean formation; and
the at least one unique transmitting parameter controls transmission of a corresponding downlink electromagnetic telemetry signal.

4. The method of claim 3, wherein:
the at least one surface system is configured to transmit the downlink electromagnetic telemetry signals by injecting current between two electrodes connected to the earth.

5. The method of claim 1, wherein:
the plurality of electromagnetic telemetry signals carry data comprising at least one of (i) a geological formation parameter measured by a downhole tool and (ii) at least one operation parameter for a downhole tool.

6. The method of claim 1, wherein:
the at least one unique transmitting parameter comprises at least one of: a timing protocol, a frequency parameter, an amplitude parameter, a phase parameter, a pulse shape parameter, a spectral shape parameter, a code-modulation sequence parameter, a space-time parameter, a space-frequency parameter, a time-frequency parameter, a modulation type parameter, an error correcting code parameter, and a data rate parameter.

7. The method of claim 1, wherein:
the plurality of electromagnetic telemetry signals includes uplink electromagnetic telemetry signals transmitted from the plurality of downhole tools to the at least one surface system, and
each downhole tool of the plurality of downhole tools is associated with a unique transmitting parameter so that uplink electromagnetic telemetry signals transmitted by each downhole tool can be received by at the at least one surface system using the unique transmitting parameter.

8. The method of claim 1, wherein:
the plurality of electromagnetic signals includes downlink electromagnetic telemetry signals transmitted from the at least one surface system to the plurality of downhole tools.

9. The method of claim 8, wherein:
the at least one surface system comprises a plurality of surface systems and each surface system is associated with a respective downhole tool of the plurality of downhole tools, and
each respective downhole tool of the plurality of downhole tools is in a different borehole.

10. The method of claim 9, wherein:
each surface system is associated with a unique transmitting parameter so that downlink electromagnetic telemetry signals transmitted by a surface system can be received by a respective downhole tool using the unique transmitting parameter.

11. The method of claim 1, wherein:
the plurality of electromagnetic telemetry signals employs duplex bidirectional communication.

12. The method of claim 1, wherein:
the signal coordination control applies a frequency division duplexing process or a frequency division multiple access process to the plurality of electromagnetic telemetry signals.

13. The method of claim 1, wherein:
the signal coordination control applies a time division duplexing process or a time division multiple access process to the plurality of electromagnetic telemetry signals.

14. The method of claim 1, wherein:
the signal coordination control applies an orthogonal frequency division multiplexing (OFDM) process, a filtered OFDM process, a discrete wavelet transforms OFDM process, or a code division multiple access process to the plurality of electromagnetic telemetry signals.

15. The method of claim 1, wherein:
the signal coordination control is carried out by a central system that is operatively coupled to the at least one surface system.

16. The method of claim 1, wherein:
the signal coordination control is carried out by a central system that is operatively coupled to a plurality of surface systems corresponding to the plurality of downhole tools.

17. The method of claim 1, wherein:
the signal coordination control involves a protocol carried out between a plurality of surface systems corresponding to the plurality of downhole tools.

18. The method of claim 1, wherein:
the signal coordination control determines the at least one unique transmitting parameter using previous communication of electromagnetic telemetry signals between the at least one surface system and one or more of the plurality of downhole tools.

19. The method of claim 1, wherein:
the signal controlling component determines the at least one unique transmitting parameter based on characteristics of effective communication channels between various transmitting tools and sensors and/or signal parameters between the various transmitting tools and sensors.

20. The method of claim 19, wherein:
the characteristics of the effective communication channels between the various transmitting tools and the sensors is estimated by sending a set of known preambles or training sequences from the transmitting tools simultaneously.

21. The method of claim 20, wherein:
the signal controlling component applies a channel model on the signals received at the sensors in response to the transmission of the training sequences in order to improve accuracy of the estimates of the characteristics of the effective communication channels between the various transmitting tools and the sensors.

22. The method of claim 20, wherein:
the signal controlling component measures signal parameters (such as time, phase, and frequency offsets) for the signals received at the sensors in response to the transmission of the training sequences.

23. The method of claim 1, wherein:
the signal coordination control is co-located with or remotely coupled to a surface-located system.

24. The method of claim 1, wherein:
the signal coordination control is co-located with or remotely coupled to a downhole tool.

25. A system comprising:
a plurality of downhole tools; and
at least one surface system comprising a processing system configured to control communication of a plurality of electromagnetic telemetry signals between the at least one surface system and the plurality of downhole tools using signal coordination control that coordinates transmission of the plurality of electromagnetic telemetry signals, wherein: the plurality of downhole tools are mounted to corresponding drill strings or completion tubing or cable or attached onto the formation; and the at least one surface system is connected to at least one sensor that measures the signal between a pair of electrodes (or a plurality of electrode pairs) in electrical contact with the earth at different locations, wherein:
the signal coordination control is configured to determine at least one unique transmitting parameter for a corresponding electromagnetic telemetry signal communicated between the at least one surface system and a first downhole tool,
the at least one unique transmitting parameter is configured to control transmission of the corresponding electromagnetic telemetry signal, and
the at least one unique transmitting parameter is configured to simultaneously suppress interference between the corresponding electromagnetic telemetry signal and at least one other electromagnetic telemetry signal communicated between the at least one surface system and a second downhole tool.

26. The system of claim 25, wherein:
the at least one unique transmitting parameter suppresses interference between the corresponding electromagnetic telemetry signal and at least one other electromagnetic telemetry signal communicated between at least one surface system and another downhole tool.

27. The system of claim 25, wherein:
the plurality of electromagnetic telemetry signals includes uplink electromagnetic telemetry signals that are transmitted by the downhole tools and propagate through a subterranean formation; and
the at least one unique transmitting parameter controls transmission of a corresponding uplink electromagnetic telemetry signal.

28. The system of claim 25, wherein:
the plurality of electromagnetic telemetry signals includes downlink electromagnetic telemetry signals that are transmitted by the least one surface system and at least one surface- located stake sensor and propagate through a subterranean formation; and
the at least one unique transmitting parameter controls transmission of a corresponding downlink electromagnetic telemetry signal.

29. The system of claim 25, wherein:
the plurality of electromagnetic telemetry signals carry data comprising at least one of (i) a geological formation parameter measured by a downhole tool and (ii) at least one operation parameter for a downhole tool.

30. The system of claim 25, wherein:
the at least one unique transmitting parameter comprises at least one of: a timing protocol, a frequency parameter, an amplitude parameter, a phase parameter, a pulse shape parameter, a spectral shape parameter, a code-modulation sequence parameter, a space-time parameter, a space-frequency parameter, a time-frequency parameter, a modulation type parameter, an error correcting code parameter, and a data rate parameter.

31. The system of claim 25, wherein the plurality of downhole tools comprises at least a first downhole tool configured to be disposed within a first borehole and a second downhole tool configured to be disposed within a second borehole.

32. The method of claim 1, wherein the plurality of downhole tools comprises at least a first downhole tool disposed within a first borehole and a second downhole tool disposed within a second borehole.

33. The method of claim 32, wherein the at least one surface system comprises a first surface system in communication with the first downhole tool and a second surface system in communication with the second downhole tool.

34. The method of claim 1, wherein:

the at least one unique transmitting parameter comprises a frequency parameter, an amplitude parameter, a phase parameter, a pulse shape parameter, a spectral shape parameter, a code-modulation sequence parameter, a space-time parameter, a space- frequency parameter, a time-frequency parameter, a modulation type parameter, an error correcting code parameter, and a data rate parameter.

35. The method of claim 1, wherein:

the plurality of electromagnetic telemetry signals employs duplex bidirectional communication that comprises communicating at least one electromagnetic telemetry signal from the at least one surface system to at least one of the plurality of downhole tools and communicating at least one electromagnetic telemetry signal from at least one of the plurality of downhole tools to the at least one surface system at the same time.

* * * * *